United States Patent
Yamasaki

(10) Patent No.: US 8,767,118 B2
(45) Date of Patent: *Jul. 1, 2014

(54) IMAGE SENSING APPARATUS, IMAGE SENSING SYSTEM AND FOCUS DETECTION METHOD

(71) Applicant: Canon Kabushiki Kaisha, Tokyo (JP)

(72) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,505

(22) Filed: Feb. 28, 2013

(65) Prior Publication Data

US 2013/0169858 A1    Jul. 4, 2013

Related U.S. Application Data

(63) Continuation of application No. 12/539,260, filed on Aug. 11, 2009, now Pat. No. 8,405,760.

(30) Foreign Application Priority Data

Aug. 25, 2008 (JP) .................................. 2008-215918

(51) Int. Cl.
*G03B 13/00* (2006.01)
*H04N 5/232* (2006.01)

(52) U.S. Cl.
USPC .......................................... 348/350; 348/349

(58) Field of Classification Search
USPC .......................................................... 348/350
See application file for complete search history.

(56) References Cited

U.S. PATENT DOCUMENTS

| | | | |
|---|---|---|---|
| 6,933,978 B1 * | 8/2005 | Suda | 348/345 |
| 7,652,713 B2 * | 1/2010 | Yamasaki | 348/345 |
| 7,792,420 B2 * | 9/2010 | Kusaka | 396/79 |
| 8,018,524 B2 * | 9/2011 | Kawarada | 348/350 |
| 8,036,523 B2 * | 10/2011 | Kusaka | 396/128 |

(Continued)

FOREIGN PATENT DOCUMENTS

| | | |
|---|---|---|
| EP | 2180362 A | 4/2010 |
| JP | 2007-134903 A | 5/2007 |

OTHER PUBLICATIONS

The above references were cited in a Apr. 24, 2013 in the EP Summs to attend oral proceedings which is enclosed of the counterpart European Patent Application No. 09168519.8.

(Continued)

*Primary Examiner* — Ngoc-Yen Vu
(74) *Attorney, Agent, or Firm* — Cowan, Liebowitz & Latman, P.C.

(57) ABSTRACT

An image sensing apparatus including: an image sensor including a plurality of focus detection pixel pairs that perform photoelectric conversion on each pair of light beams that have passed through different regions of a photographing lens and output an image signal pair; a flash memory that stores shift information on relative shift between an optical axis of the photographing lens and a central axis of the focus detection pixel pairs; a correction unit that corrects a signal level of the image signal pair based on the shift information and exit pupil information of the photographing lens so as to compensate for an unbalanced amount of light that enters each of the focus detection pixel pairs; and a focus detection unit that detects a focus of the photographing lens using the image signal pair corrected by the correction unit.

13 Claims, 22 Drawing Sheets

(56) References Cited

U.S. PATENT DOCUMENTS

| | | | |
|---|---|---|---|
| 8,149,324 B2* | 4/2012 | Oikawa | 348/349 |
| 8,363,153 B2* | 1/2013 | Tsukada | 348/350 |
| 2002/0039489 A1 | 4/2002 | Matsuda | |
| 2010/0328503 A1* | 12/2010 | Shintani et al. | 348/272 |
| 2012/0268634 A1* | 10/2012 | Fukuda et al. | 348/302 |
| 2012/0300104 A1* | 11/2012 | Onuki et al. | 348/302 |

OTHER PUBLICATIONS

The above reference was cited in a Dec. 24, 2013 Japanese Office Action, which is enclosed without English Translation, that issued in Japanese Patent Application No. 2012-275093.

* cited by examiner

PLAN VIEW

A-A CROSS-SECTIONAL VIEW

PLAN VIEW

A-A CROSS-SECTIONAL VIEW

WITH ERROR

WITHOUT ERROR

WITH ERROR

WITHOUT ERROR

F I G. 15
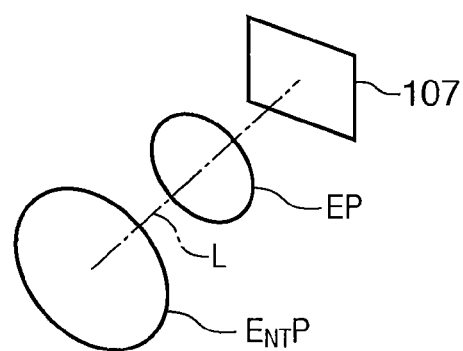
F I G. 16
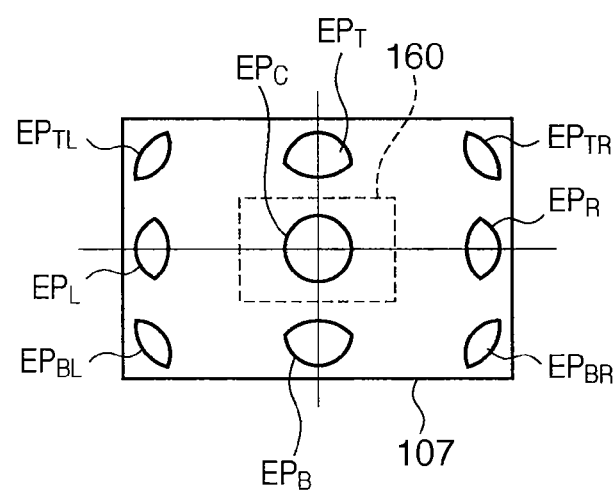

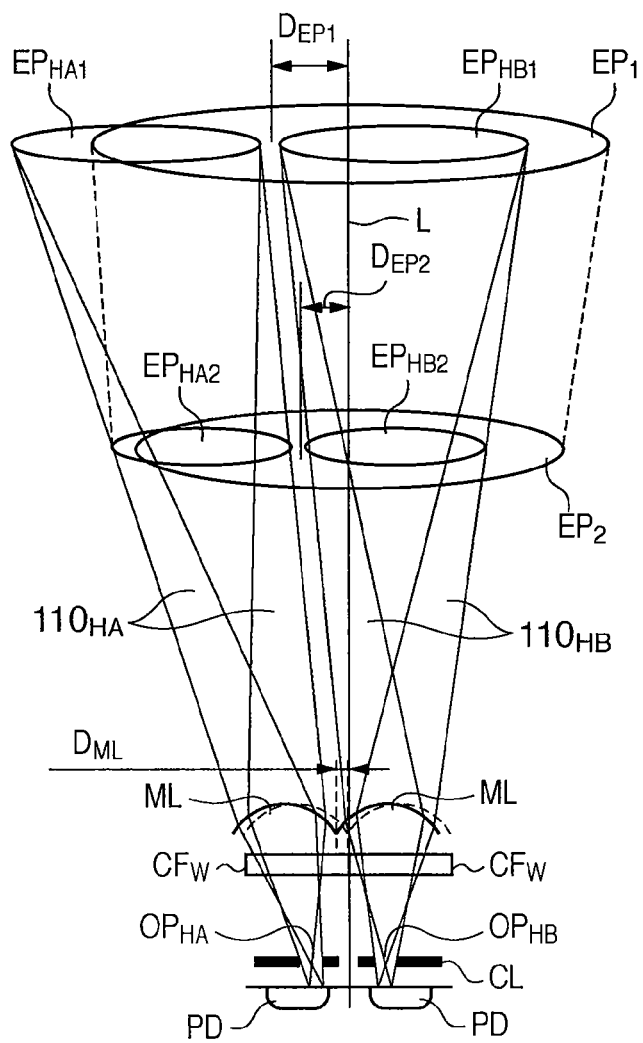
F I G. 20

TELEPHOTO END

WIDE-ANGLE END

IMAGE SENSING APPARATUS, IMAGE SENSING SYSTEM AND FOCUS DETECTION METHOD

CROSS-REFERENCE TO RELATED APPLICATIONS

This application is a continuation of application Ser. No. 12/539,260, filed Aug. 11, 2009 the entire disclosure of which is hereby incorporated by reference.

BACKGROUND OF THE INVENTION

1. Field of the Invention

The present invention relates to an image sensing apparatus, an image sensing system, and a focus detection method and, more particularly, to an image sensing apparatus such as a digital still camera, a video camera and a silver-halide camera, an image sensing system, and a focus detection method.

2. Description of the Related Art

A contrast detection method and a phase-difference detection method are used as general methods that employ light beams that have passed through a photographing lens in focus detection and the adjustment of an image sensing device. The contrast detection method is often used in video cameras and digital still cameras, in which an image sensor is used as a focus detection sensor. This method pays attention to the output signal of the image sensor, in particular, information on a high-frequency component (contrast information), and information on the position of the photographing lens (where the evaluation value reaches a maximum) is set as an in-focus position. However, the contrast detection method, also called a hill-climbing detection method, is not suitable for high-speed focus adjustment operations because it is necessary to find an evaluation value while slightly moving the photographing lens, and to keep the photographing lens moving until the evaluation value is deemed to have reached a maximum.

The phase-difference detection method, on the other hand, is often used in single lens reflex cameras that use a silver-halide film, and is the technique that has contributed most to the practical use of auto focus (AF) single lens reflex cameras. According to the phase-difference detection method, a light beam that has passed through the exit pupil of the photographing lens is divided into two, and the two divided light beams are respectively received by a pair of focus detection sensors. The amount of defocus for the photographing lens in the focusing direction is directly determined by detecting the difference between the signals output according to the amount of light received, or in other words, an amount of relative positional shift in the direction in which the light beam is divided. Accordingly, once an accumulation operation is executed by the focus detection sensors, the amount of defocus and the direction of defocus can be obtained, making it possible to perform a high-speed focus adjustment operation.

In order to obtain signals corresponding to each of two divided light beams, generally, an optical path dividing mechanism, such as a half-mirror or reflecting mirror, having a quick return mechanism is provided in the image sensing optical path, and a focus detection optical system and an AF sensor are provided beyond the optical path dividing mechanism.

However, in order to perform focus detection using the phase-difference detection method, it is necessary to set the focus detection optical system such that the two divided light beams will not be vignetted even when a change in the exit pupil or image height of the photographing lens, a change in the zoom position, or the like, occurs. In particular, in a camera system to which a plurality of photographing lenses that have different exit pupil positions, diameters and degrees of vignetting can be attached, many restrictions are required to perform focus detection without vignetting. Consequently, there are problems such as not being able to set a wide focus detection region, not being able to improve the accuracy of two divided light beams by base-line length extension, and so on.

In view of the above circumstances, Japanese Patent Laid-Open No. 03-214133 discloses an example in which focus detection is performed after correcting a reduction in the amount of light to be converted into a focus detection signal caused by vignetting of a focus detection light beam based on information on the exit pupil of the photographing lens or the like. According to this example, focus detection using the phase-difference method can be performed even when slight vignetting exists, so wide range focus detection and highly accurate focus detection by base-line length extension can be performed.

In recent years, a technique has also been disclosed in which a phase difference detection function is provided for an image sensor so as to eliminate the need for a dedicated AF sensor and in order to achieve high-speed phase difference AF.

For example, according to Japanese Patent Laid-Open No. 2000-156823, a pupil-dividing function is provided for some of the light-receiving elements (pixels) of an image sensor by offsetting the sensitivity region of the light-receiving portion from the optical axis of the on-chip microlens. These pixels are used as focus detection pixels, and arranged with a prescribed spacing between image sensing pixel groups to perform phase-difference focus detection. The portions where the focus detection pixels are arranged correspond to portions where image sensing pixels do not exist, so image information is generated through interpolation using information from the peripheral image sensing pixels. With this example, focus detection using the phase-difference method can be performed at the image sensing surface, achieving high-speed and highly accurate focus detection.

However, Japanese Patents Laid-Open Nos. 03-214133 and 2000-156823 have the following problems.

According to Japanese Patent Laid-Open No. 03-214133, the reduction in the amount of light to be converted into a focus detection signal caused by vignetting of the photographing lens is corrected based on the information on the photographing lens side. However, the degree of vignetting varies according to not only the information on the photographing lens side, but also according to a production error on the camera side. In particular, in a single lens reflex camera, because a complicated conversion and separation of the optical path are performed by a focus detection optical system, the production error caused thereby is large. Accordingly, even when the reduction in the amount of light is corrected based on only the information on the photographing lens side, an error occurs in the result of the focus detection.

According to Japanese Patent Laid-Open No. 2000-156823, because pupil division is realized using the relative positional relationship between the on-chip microlens and the light-receiving portion, a problem arises in that the pupil division undergoes a large shift due to a production error in the on-chip microlens. In such pupil division using an on-chip microlens, the light-receiving portion located several microns below the microlens is reversely projected to the exit pupil position of the photographing lens that is located several tens to several hundreds of millimeters away and, as a result, the imaging magnification becomes very large. Accordingly, a slight production error in the on-chip microlens can result in a large shift, causing significant vignetting in the focus detection light beam, and making focus detection not possible.

SUMMARY OF THE INVENTION

The present invention has been made in consideration of the above situation, and provides focus detection that uses the phase-difference method with high accuracy even when vignetting is caused in a focus detection light beam by a production error.

According to the present invention, an image sensing apparatus comprising: an image sensor including a plurality of focus detection pixel pairs that perform photoelectric conversion on each pair of light beams that have passed through different regions of a photographing lens and output an image signal pair; a storage unit configured to store shift information on relative shift between an optical axis of the photographing lens and a central axis of the focus detection pixel pairs; a correction unit configured to correct a signal level of the image signal pair based on the shift information and exit pupil information of the photographing lens so as to compensate for an unbalanced amount of light that enters each of the focus detection pixel pairs; and a focus detection unit configured to detect a focus of the photographing lens using the image signal pair corrected by the correction unit.

Further, according to the present invention, an image sensing system comprises: the image sensing apparatus as described above; and a lens unit that is detachable from the image sensing apparatus, wherein the shift information is stored in the image sensing apparatus, the exit pupil information is stored in the lens unit, and the exit pupil information is transmitted from the lens unit to the image sensing apparatus.

Further, according to the present invention, a focus detection method in an image sensing apparatus, the method comprises the steps of: performing photoelectric conversion on each pair of light beams that have passed through different regions of a photographing lens and outputting an image signal pair by a plurality of focus detection pixel pairs included in an image sensor; acquiring shift information on relative shift between an optical axis of the photographing lens and a central axis of the focus detection pixel pairs; correcting a signal level of the image signal pair based on the shift information and exit pupil information of the photographing lens so as to compensate for an unbalanced amount of light that enters each of the focus detection pixel pairs; and detecting a focus of the photographing lens using the image signal pair corrected in the correction step.

Further, features of the present invention will become apparent from the following description of exemplary embodiments with reference to the attached drawings.

BRIEF DESCRIPTION OF THE DRAWINGS

FIG. 15 is a diagram showing the relationship between an entrance pupil and an exit pupil;

FIG. 16 is a diagram showing an image sensor and exit pupil shapes depending on the corresponding image height of the image sensor;

FIG. 20 is a diagram used to illustrate a structure of focus detection pixels according to Embodiment 2 of the present invention;

DESCRIPTION OF THE EMBODIMENTS

Preferred embodiments of the present invention will be described in detail in accordance with the accompanying drawings.

Embodiment 1

Figure 1:
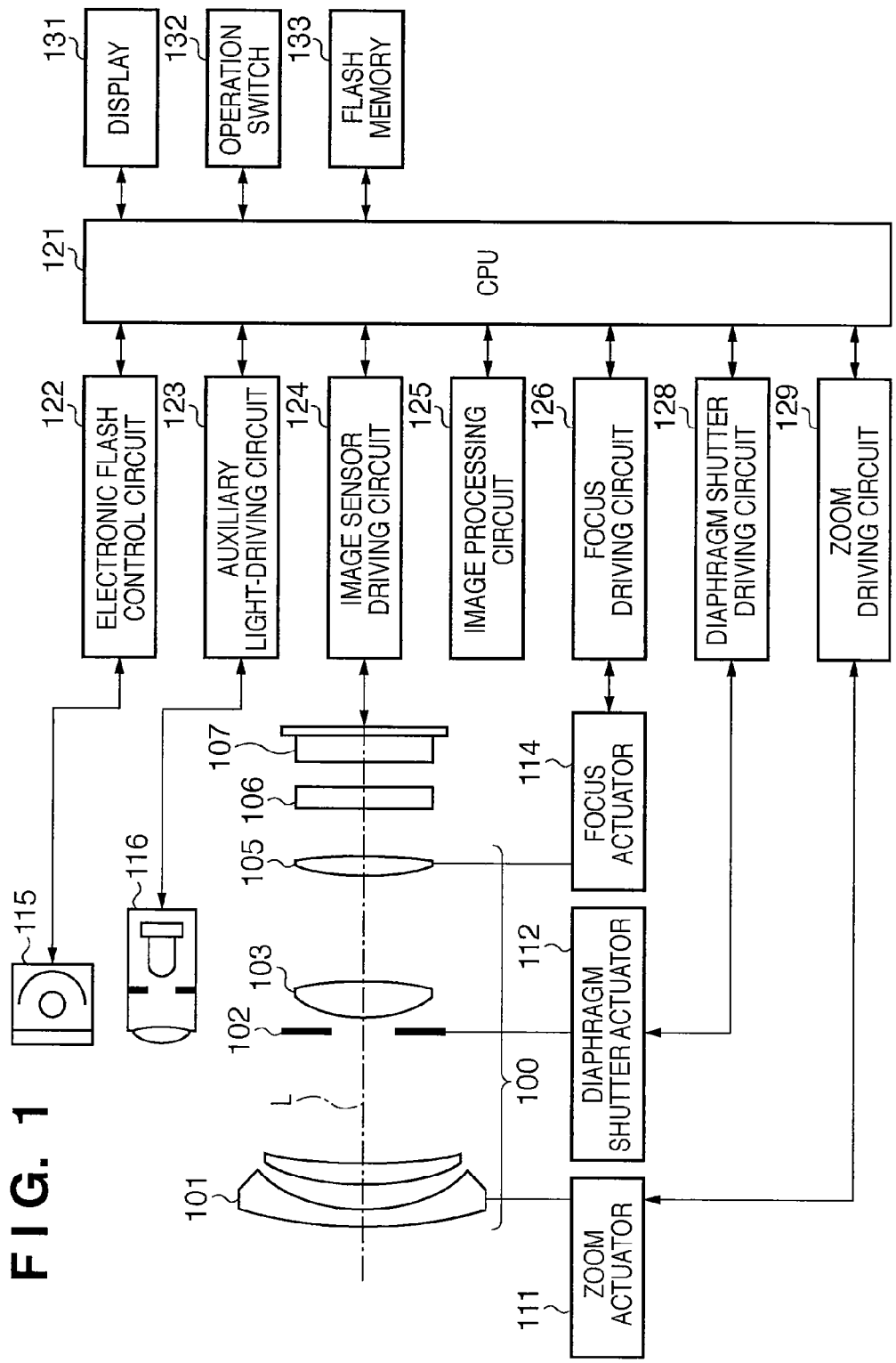
FIG. 1 is a block diagram showing a configuration of a camera according to Embodiment 1 of the present invention.

FIG. 1 is a block diagram showing a configuration of a camera according to Embodiment 1 of the present invention, and shows, as an example, a digital still camera in which a camera body, including an image sensor, and a photographing lens 100 are integrated.

In FIG. 1, L indicates the optical axis of the photographing lens 100. Reference numeral 101 denotes a first lens group disposed at the front end of the photographing lens 100, and is held so as to be capable of moving back and forth in the optical axis direction. 102 denotes a diaphragm shutter that adjusts the amount of light when photographing by adjusting its aperture diameter and has a function of adjusting an exposure time when photographing a still image. 103 denotes a second lens group. The diaphragm shutter 102 and the second lens group 103 integrally move back and forth in the optical axis direction, and realize a magnification function (zoom function) in conjunction with the back and forth movement of the first lens group 101.

105 denotes a third lens group that performs focus adjustment by moving back and forth in the optical axis direction. 106 denotes an optical low pass filter that is an optical element for reducing false color and moiré in photographed images. 107 denotes an image sensor that includes a CMOS image sensor and peripheral circuits thereof. In the image sensor 107, primary color filters provided in a Bayer arrangement are formed on-chip on a light-receiving pixel area formed of m pixels in the lateral direction and n pixels in the longitudinal direction.

111 denotes a zoom actuator that performs a magnifying operation by rotating a cam barrel (not shown) so as to move the first lens group 101, the diaphragm shutter 102 and the second lens group 103 in the optical axis direction. 112 denotes a diaphragm shutter actuator that adjusts the amount of photographing light by controlling the aperture diameter of the diaphragm shutter 102 and controls the exposure time when photographing a still image. 114 denotes a focus actuator that performs focus adjustment moving the third lens group 105 back and forth in the optical axis direction.

115 denotes an electronic flash for illuminating an object when photographing, and a flash illumination device using a xenon tube is preferably used, but it is also possible to use an illumination device that includes LEDs that continuously emit light. 116 denotes an AF auxiliary light-emitting unit that projects an image of a mask having a prescribed opening pattern toward an object field via a light projection lens so as to improve the focus detecting capability for a dark object or a low-contrast object.

121 denotes a CPU that controls various operations of the camera within the image sensing apparatus. The CPU 121 includes, for example, a computation unit, a ROM, a RAM, an A/D converter, a D/A converter, a communication interface circuit, and so on. The CPU 121 drives various circuits of the image sensing apparatus and executes a series of operations, such as AF, photographing, image processing and recording, based on prescribed programs stored in the ROM.

122 denotes an electronic flash control circuit that controls the electronic flash 115 to emit light in synchronization with a photographing operation. 123 denotes an auxiliary light-driving circuit that controls the AF auxiliary light-emitting unit 116 so as to emit light in synchronization with a focus detection operation. 124 denotes an image sensor driving circuit that controls the image sensing operation of the image sensor 107 and converts the acquired analog image signal into a digital signal to transmit it to the CPU 121. 125 denotes an image processing circuit that performs processes on the image acquired by the image sensor 107, such as γ conversion, color interpolation, JPEG compression and so on.

126 denotes a focus driving circuit that drives and controls the focus actuator 114 based on the results of focus detection, and performs focus adjustment by moving the third lens group 105 back and forth in the optical axis direction. 128 denotes a diaphragm shutter driving circuit that drives and controls the diaphragm shutter actuator 112 so as to control the aperture of the diaphragm shutter 102. 129 denotes a zoom driving circuit that drives the zoom actuator 111 in response to a zoom operation by a photographer.

131 denotes a display, such as an LCD, that displays information regarding a photographing mode of the image sensing apparatus, preview images before photographing, confirmation images after photographing, focus state display images at the time of focus detection, and so on. 132 denotes an operation switch group that includes a power switch, a release (photographing trigger) switch, a zoom operation switch, a photographing mode selection switch, and so on. 133 denotes a detachable flash memory that records photographed images.

Figure 2:
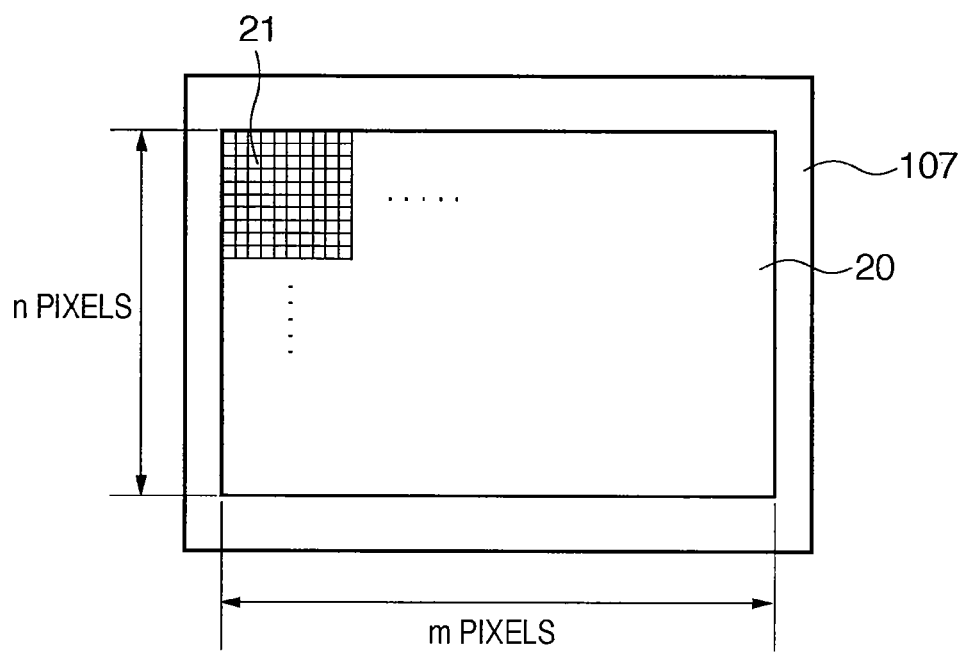
FIG. 2 is a plan view of light-receiving pixels of an image sensor according to Embodiment 1 of the present invention, as viewed from a photographing lens side.

FIG. 2 is a plan view of light-receiving pixels, on which an object image is formed, of the image sensor 107 of FIG. 1, as viewed from the photographing lens 100 side. 20 indicates an entire pixel area including m pixels in the lateral direction and n pixels in the longitudinal direction formed on the image sensor 107, and one of the pixel portions is indicated by 21. In each pixel portion, primary color filters in a Bayer arrangement are formed on-chip, that is, a 2×2 pixel group including four pixels is repeatedly arranged. For the sake of simplifying the drawing, only the pixel portion that is formed of 10×10 pixels is shown on the upper left side of FIG. 2, and other pixel portions are omitted.

FIGS. 3A, 3B, 4A and 4B are diagrams illustrating a structure of image sensing pixels and focus detection pixels of the pixel portion shown in FIG. 2. In Embodiment 1, a Bayer arrangement is adopted, that is, in 2×2 pixel groups including four pixels, two pixels that have a G (green) spectral sensitivity are arranged diagonally, and one pixel that has an R (red) spectral sensitivity and one pixel that has a B (blue) spectral sensitivity are arranged diagonally. And, focus detection pixels that have a structure described later are arranged between such Bayer blocks.

Figure 3A:
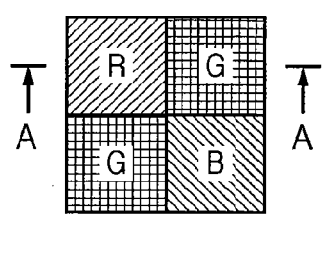
FIGS. 3A and 3B are diagrams used to illustrate a structure of image sensing pixels according to Embodiment 1 of the present invention.
Figure 3B:
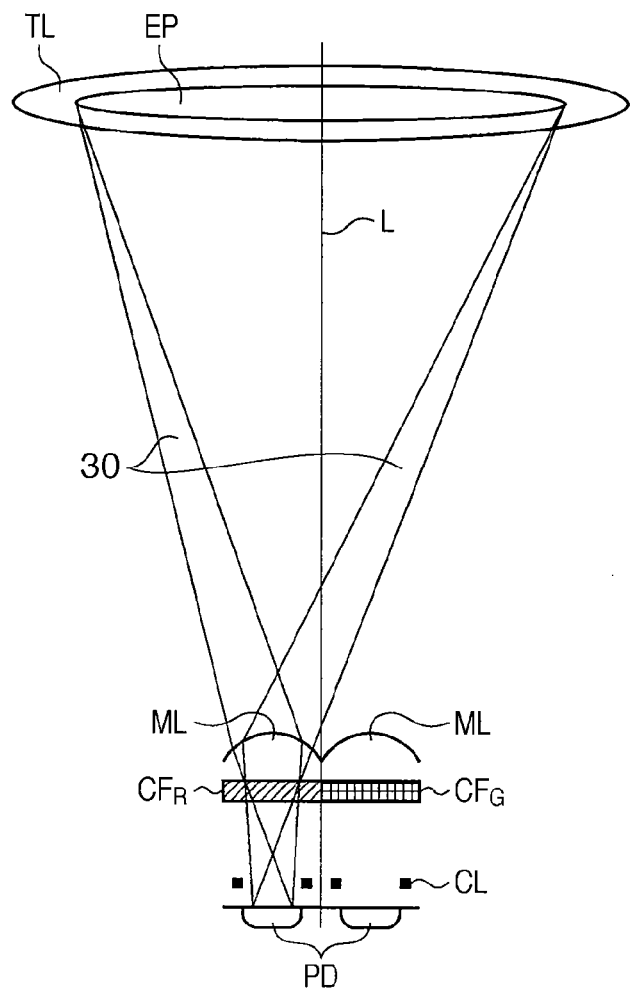

FIGS. 3A and 3B show the arrangement and structure of image sensing pixels. FIG. 3A is a plan view of 2×2 image sensing pixels. FIG. 3B shows a cross-sectional view taken along the A-A line of FIG. 3A. ML denotes an on-chip microlens disposed on the front surface of each pixel. $CF_R$ denotes an R (red) color filter, and $CF_G$ denotes a G (green) color filter. Photoelectric conversion elements of the image sensor 107 are schematically shown as PDs (photodiodes). A CL (contact layer) is a wiring layer for forming signal wires that transmit various signals within the image sensor 107. The photographing lens 100 is schematically shown as a TL (taking lens), and L indicates the optical axis of the photographing lens TL. It should be noted that FIGS. 3A and 3B are diagrams showing a structure of the pixels in the vicinity of the center of the image sensor 107, that is, the pixels in the vicinity of the axis of the photographing lens TL.

The on-chip microlens ML and the photoelectric conversion element PD of an image sensing pixel are configured so as to be capable of receiving light beams that have passed through the photographing lens TL as effectively as possible. In other words, an exit pupil (EP) of the photographing lens TL and the photoelectric conversion element PD are in a conjugate relationship with each other with respect to the microlens ML, and the photoelectric conversion element is designed to have a large effective area. Light beams 30 show such a state, and light beams passed through the entire region of the exit pupil EP are received by the photoelectric conversion element PD. In FIG. 3B, light beams that enter the R pixel are described, but the G pixel and the B (blue) pixel also have the same structure.

Figure 4B:
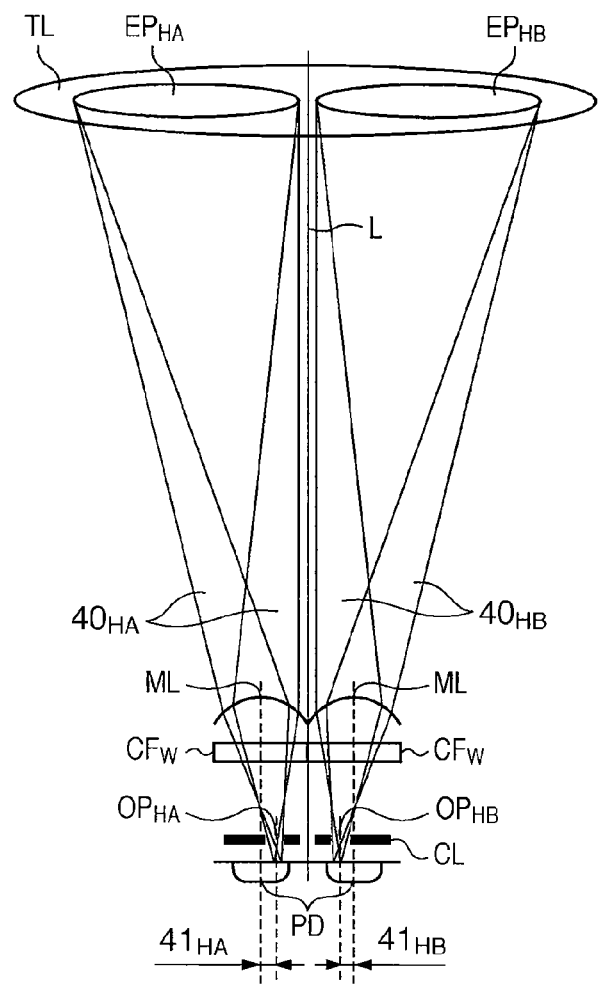
FIGS. 4A and 4B are diagrams used to illustrate a structure of focus detection pixels according to Embodiment 1 of the present invention.
Figure 4A:
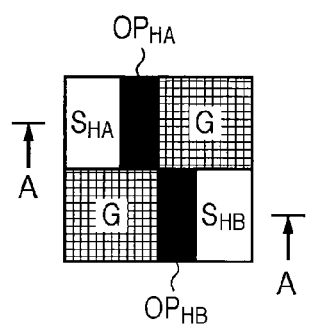

FIGS. 4A and 4B show the arrangement and structure of focus detection pixels for dividing the pupil in the horizontal direction (lateral direction) of the photographing lens TL. As used herein, the horizontal direction refers to a lengthwise direction of the image sensor 107 shown in FIG. 2. FIG. 4A is a plan view of 2×2 pixels including focus detection pixels. When obtaining a signal of an image for recording or viewing, the primary component of luminance information is acquired by G pixels. This is because the image recognition characteristics of a human are sensitive to such luminance information. Accordingly, if the G pixels are lost, degradation of the image quality is likely to be perceived. On the other hand, an R pixel or a B pixel is a pixel used to acquire color information (color difference information), but because the visual characteristics of a human are insensitive to such color information, even if a small number of pixels for acquiring color information are lost, degradation of the image quality is unlikely to be recognized. For this reason, in Embodiment 1, the G pixels in 2×2 pixels are left as image sensing pixels, and the R and B pixels are replaced by focus detection pixels. In FIG. 4A, such a focus detection pixel pair is indicated by $S_{HA}$ and $S_{HB}$.

FIG. 4B shows a cross-sectional view taken along the A-A line of FIG. 4A. The microlens ML and the photoelectric conversion element PD have the same structure as those of the image sensing pixels shown in FIG. 3B. As in FIGS. 3A and 3B, FIGS. 4A and 4B are also diagrams showing a structure of the pixels in the vicinity of the center of the image sensor 107, that is, the pixels in the vicinity of the axis of the photographing lens TL.

In Embodiment 1, because signals from the focus detection pixels are not used to generate an image, a transparent film CFW (white) is disposed thereon instead of a color separation color filter. In addition, an opening of the wiring layer CL is offset in a single direction from the center line of the microlens ML, so that the pupil is divided by the image sensor 107. Specifically, an opening $OP_{HA}$ of a pixel $S_{HA}$ is offset to the right side from the center line of the microlens ML by an amount $41_{BA}$, so that light beams $40_{HA}$ that have passed through an exit pupil region $EP_{HA}$ located on the left side of the optical axis L of the photographing lens TL are received. Similarly, an opening $OP_{HB}$ of a pixel $S_{HB}$ is offset to the left side from the center line of the microlens ML by an amount $41_{HB}$, so that light beams $40_{HB}$ that have passed through an exit pupil region $EP_{HB}$ located on the right side of the optical axis L of the photographing lens TL are received. As is clearly seen from FIG. 4B, the offset amount $41_{HA}$ is equal to the offset amount $41_{HB}$.

Pixels $S_{HA}$ configured as described above are regularly arranged in the horizontal direction, and an object image acquired by a group of pixels $S_{HA}$ is defined as an image A. Likewise, pixels $S_{HB}$ are also regularly arranged in the horizontal direction, and an object image acquired by a group of pixels $S_{HB}$ is defined as an image B. With such a configuration, by detecting the relative positions of the image A and the image B, it is possible to detect the amount of defocus of the object image.

Figure 5:
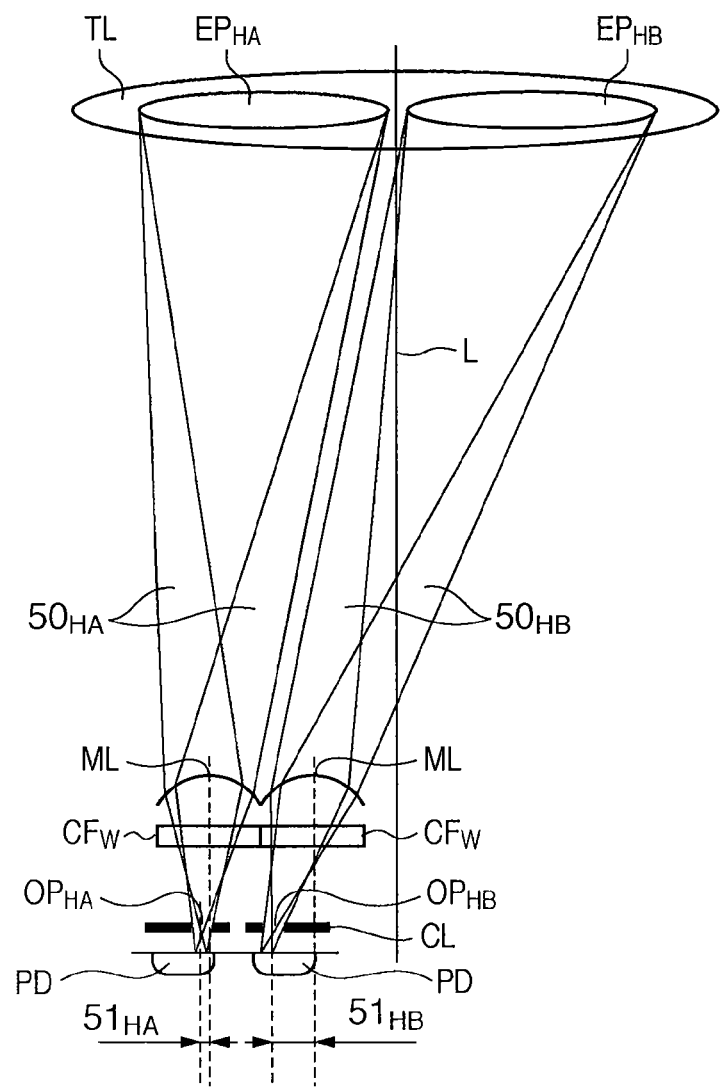
FIG. 5 is a diagram used to illustrate a structure of focus detection pixels in the peripheral portion of the image sensor according to Embodiment 1 of the present invention.

As in FIG. 4B, FIG. 5 is also a cross-sectional view taken along the A-A line of FIG. 4A, but it shows a structure regarding focus detection pixels located in the peripheral portion of the image sensor 107. In the peripheral portion, the openings $OP_{HA}$ and $OP_{HB}$ of the wiring layer CL are offset from the microlens ML differently from FIG. 4B for pupil division. Taking the opening $OP_{HA}$ as an example, the opening $OP_{HA}$ is offset such that the center of the substantially hemispherical microlens ML matches a line connecting the center of the opening $OP_{HA}$ and the center of the exit pupil region $EP_{HA}$. By doing so, pupil division can be performed on the pixels in the peripheral portion as well, almost equally to those on the axis.

Specifically, the opening $OP_{HA}$ of the pixel $S_{HA}$ is offset to the left side from the center line of the microlens ML by an amount $51_{HA}$, so that light beams $50_{HA}$ that have passed through the exit pupil region $EP_{HA}$ located on the left side of the optical axis L of the photographing lens TL are received. Similarly, the opening $OP_{HB}$ of the pixel $S_{HR}$, is offset to the left side from the center line of the microlens ML by an amount $51_{HB}$, so that light beams $50_{HB}$ that have passed through the exit pupil region $EP_{HB}$ located on the right side of the optical axis L of the photographing lens TL are received. As is clearly seen from FIG. 5, the offset amount $51_{HB}$ is set to be larger than the offset amount $51_{HA}$. Up to here, offsetting in the peripheral portion in the horizontal direction was described as an example, but pupil division can also be realized on the peripheral portion in the vertical direction, and on the peripheral portion in both the horizontal and vertical directions, using the same method.

With the focus detection pixel pair $S_{HA}$ and $S_{HB}$ it is possible to perform focus detection on an object that has a luminance distribution in the lateral direction of the photographing screen, for example, a longitudinal line, but it is not possible to perform focus detection on a lateral line that has a luminance distribution in the longitudinal direction. To address this, a configuration may be adopted to provide pixels that realize pupil division in the vertical direction (longitudinal direction) of the photographing lens.

Figure 6:
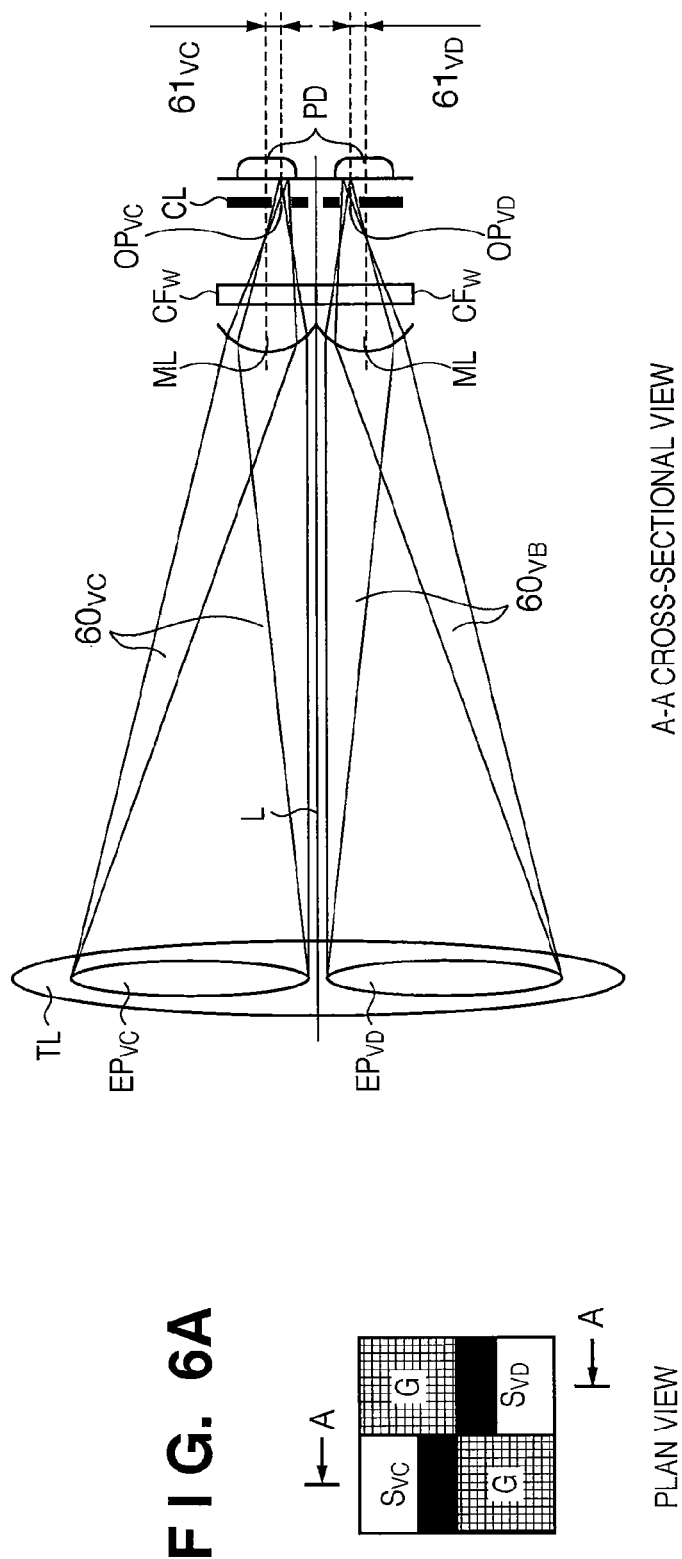
FIGS. 6A and 6B are diagrams used to illustrate a structure of focus detection pixels that divides the pupil in the vertical direction of a photographing lens according to Embodiment 1 of the present invention.

FIGS. 6A and 6B show the arrangement and structure of focus detection pixels for dividing the pupil in the longitudinal direction of the photographing lens. As used herein, "vertical direction" and "longitudinal direction" refer to the direction of the shorter side of the image sensor 107 shown in FIG. 2. FIG. 6A is a plan view of 2×2 pixels including focus detection pixels. As in FIG. 4A, the G pixels are left as image sensing pixels, and the R and B pixels are replaced by focus detection pixels. In FIG. 6A, the focus detection pixels are indicated by $S_{VC}$ and $S_{VD}$.

FIG. 6B shows a cross-sectional view taken along the A-A line of FIG. 6A. The structure of the pixels shown in FIG. 6B are the same as that of the pixels shown in FIG. 4B except that the focus detection pixels of FIG. 4B have a structure of dividing the pupil in the lateral direction, while the focus detection pixels of FIG. 6B have a structure of dividing the pupil in the longitudinal direction. An opening $OP_{VC}$ of a pixel $S_{VC}$ is offset to the lower side from the center line of the microlens ML by an amount $61_{VC}$, so that light beams $60_{VC}$ that have passed through an exit pupil region $EP_{VC}$ located on the upper side of the optical axis L of the photographing lens TL are received. Similarly, an opening $OP_{VD}$ of a pixel $S_{VC}$, is offset to the upper side from the center line of the microlens ML by an amount $61_{VD}$, so that light beams $60_{VD}$ that have passed through an exit pupil region $EP_{VD}$ located in the lower side of the optical axis L of the photographing lens TL are received. As is clearly seen from FIGS. 6A and 6B, the offset amount $61_{VC}$ and the offset amount $61_{VD}$ are equal because FIGS. 6A and 6B show the structure of the pixels in the vicinity of the axis of the image sensor 107 as in FIGS. 4A and 4B.

Pixels $S_{VC}$ configured as described above are regularly arranged in the vertical direction, and an object image acquired by a group of pixels $S_{VC}$ is defined as an image C. Likewise, pixels $S_{VD}$ are also regularly arranged in the vertical direction, and an object image acquired by a group of pixels $S_{VD}$ is defined as an image D. With such a configuration, by detecting the relative positions of the image C and the image D, it is possible to detect the amount of defocus of an object image that has a luminance distribution in the vertical direction. In the case of pupil division in the longitudinal direction as well, for the focus detection pixels located in the peripheral portion, the method described in FIG. 5 is used to perform pupil division, so a description thereof is omitted here.

Because the focus detection pixel pair $S_{HA}$ and $S_{HB}$ and the focus detection pixel pair $S_{VC}$ and $S_{VD}$ do not have color information, when forming a photographed image, interpolation computation is performed using the signals of the neighboring pixels so as to create a signal. Accordingly, by arranging the focus detection pixel pairs discretely in the image sensor 107 rather than continuously, the quality of photographed images is not reduced.

As described above with reference to FIGS. 3A to 6B, the image sensor 107 functions not only as an image sensor, but also as a focus detection unit of the present invention.

Figure 7:
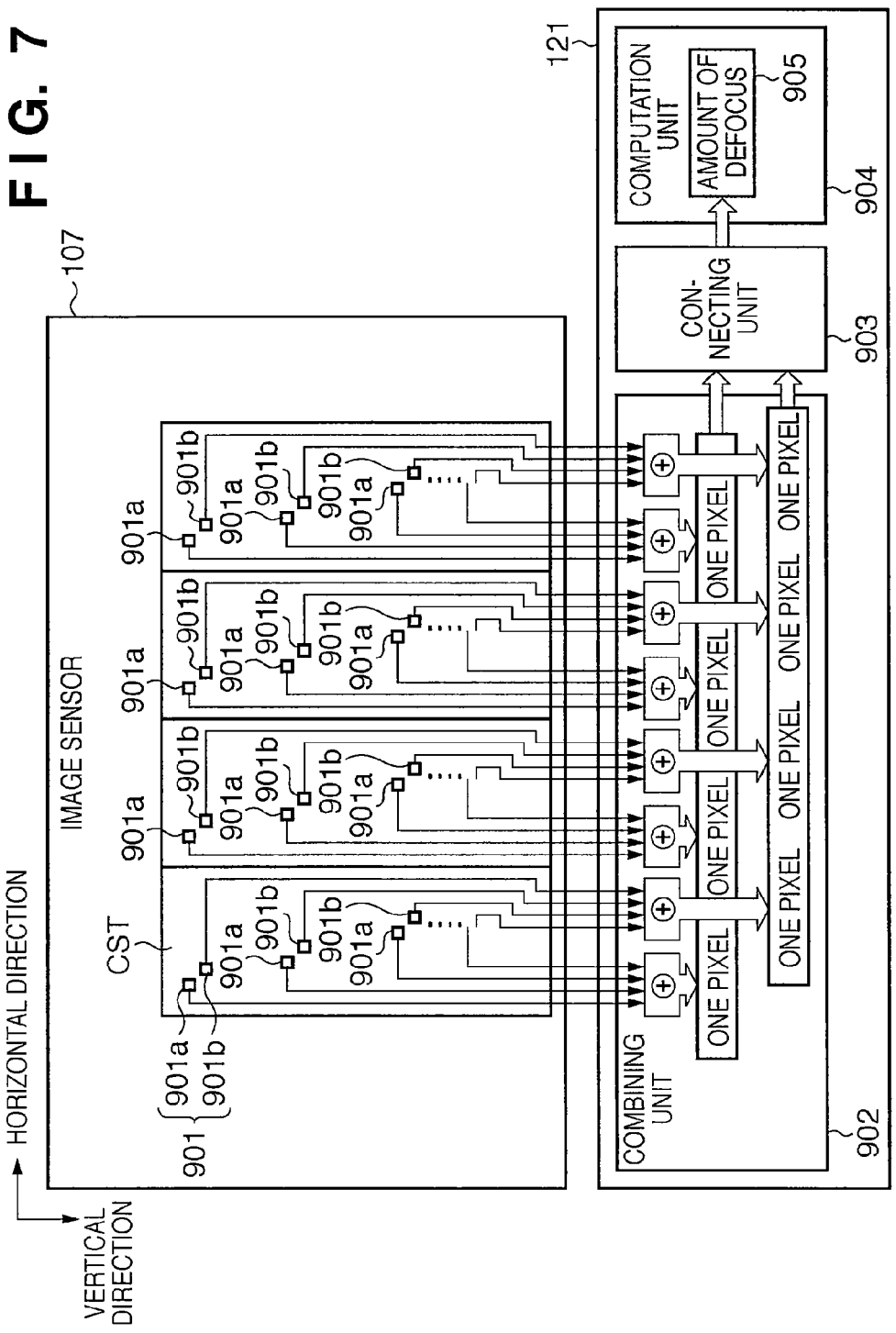
FIG. 7 is a diagram schematically showing a focus detection configuration according to Embodiment 1 of the present invention.

FIG. 7 is a diagram schematically showing a focus detection configuration according to the present invention. The image sensor 107 includes a plurality of focus detection units 901, each including a first focus detection pixel 901a and a second focus detection pixel 901b, together realizing pupil division. The focus detection unit 901 has the configuration shown in FIG. 4A, and the focus detection pixel 901a corresponds to the pixel $S_{HA}$, and the focus detection pixel 901b corresponds to the pixel $S_{HB}$. The image sensor 107 also includes a plurality of image sensing pixels for performing photoelectric conversion on an object image formed by the photographing lens 100.

The CPU 121 includes a combining unit 902, a connecting unit 903, and a computation unit 904. Also, the CPU 121 assigns a plurality of sections (regions) CST on the image sensing surface of the image sensor 107 so as to include a plurality of focus detection units 901. The CPU 121 can change the size, arrangement, number and the like of the sections CST as appropriate. The combining unit 902 performs a process of obtaining one pixel's worth of a first combined signal by combining the output signals from the first focus detection pixels 901a for each of the plurality of sections CST assigned on the image sensor 107. The combining unit 902 also performs a process of obtaining one pixel's worth of a second combined signal by combining the output signals from the second focus detection pixel 901b for each section CST. The connecting unit 903 performs a process of obtaining a first connection signal by connecting the first combined signals and a process of obtaining a second connection signal by connecting the second combined signals for the plurality of sections CST. In this manner, for the first focus detection pixels 901a and the second focus detection pixels 901b, connection signals in which combined signals of the pixels in a number corresponding to the number of sections are connected are obtained. The computation unit 904 computes an amount of defocus for the imaging optical system based on the first connection signal and the second connection signal. As described above, because the output signals of the focus detection pixels that are arranged in each section in the same pupil-dividing direction are combined, even when luminance levels obtained from individual focus detection units are small, it is possible to sufficiently obtain the luminance distribution of the object.

In FIG. 7, an example in which the pupil is divided in the horizontal direction is given, but the same can apply to the case in which the pupil is divided in the vertical direction.

Figure 8:
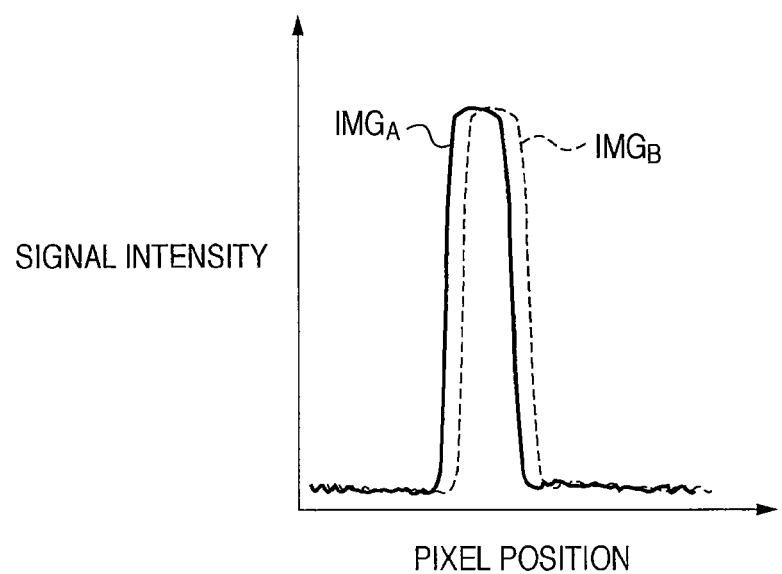
FIG. 8 is a diagram showing focus detection signals according to Embodiment 1 of the present invention.

FIG. 8 shows an example of a focus detection signal pair (image signal pair) that is formed by the focus detection unit 901, the combining unit 902 and the connecting unit 903 and inputted into the computation unit 904 of FIG. 7. In the graph of FIG. 8, the lateral axis indicates positions of pixels in the direction in which the pixels of the connected signal are arranged, and the longitudinal axis indicates the signal intensity. The focus detection signals shown in FIG. 8 are signals obtained by sensing a single vertical line. A focus detection signal $IMG_A$ is a signal formed by focus detection pixels 901a, and a focus detection signal $IMG_B$ is a signal formed by focus detection pixels 901b. Here, because the photographing lens 100 shown in FIG. 1 is shifted to the rear focus side with respect to the image sensor 107, the focus detection signal $IMG_A$ is shifted to the left side, and the focus detection signal $IMG_B$ is shifted to the right side.

By calculating the shift amounts of the focus detection signals $IMG_A$ and $IMG_B$ by a known correlation computation or the like, the amount by which the photographing lens 100 is defocused can be obtained, so focusing becomes possible. Because the calculation of a shift amount is known, a description thereof is omitted here. FIG. 8 was described taking the case in which the lens is shifted to the rear focus side as an example, but when the lens is shifted to the front focus side, the directions in which the focus detection signals $IMG_A$ and $IMG_B$ shift are laterally reversed.

Figure 9:
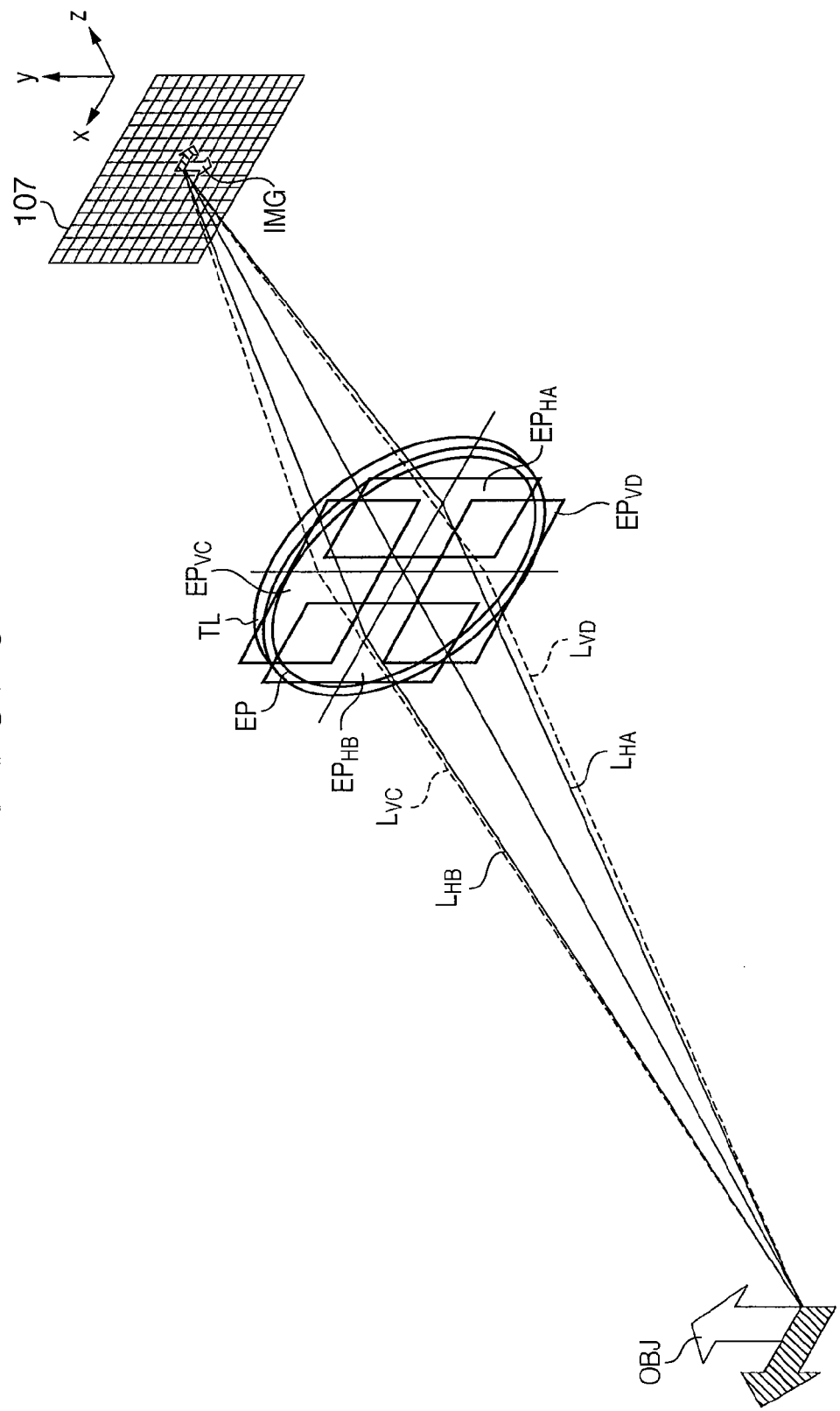
FIG. 9 is a diagram conceptually illustrating a pupil-dividing function realized by focus detection pixels according to Embodiment 1 of the present invention.

FIG. 9 is a diagram conceptually illustrating a pupil-dividing function realized by the focus detection pixels of the image sensor 107. TL denotes a photographing lens, 107 denotes the image sensor, OBJ denotes an object, and IMG denotes an object image.

As described with reference to FIGS. 3A and 3B, the image sensing pixels receive light beams that have passed through the entire exit pupil region EP of the photographing lens TL. The focus detection pixels, on the other hand, have a pupil-dividing function as described with reference to FIGS. 4A to 6B. Specifically, the pixel $S_{HA}$ of FIGS. 4A and 4B receives a light beam $L_{HA}$ that has passed through a pupil located on the left side as viewed from the image sensing surface toward the rear end of the lens, or in other words, a light beam that has passed through the pupil $EP_{HA}$ of FIGS. 4A and 4B. Similarly, the pixels $S_{HB}$, $S_{VC}$ and $S_{VD}$ receive light beams that have passed through the exit pupil regions $EP_{HB}$, $EP_{VC}$ and $EP_{VD}$, respectively. Because the focus detection pixels are distributed over the entire region of the image sensor 107, focus detection is possible in the entire image sensing region as well. With the configuration as described above, it is possible to perform focus detection using the phase-difference method over a wide area of the image sensor 107.

The foregoing was described in the context of a focus detection system in an ideal state without considering production errors, but in practice, a large shift will occur in the focus detection exit pupil regions $EP_{HA}$, $EP_{HB}$, $EP_{VC}$ and $EP_{VD}$ due to variable factors such as production errors. Accordingly, in the present invention, such shift information is pre-stored, and by correcting a focus detection signal, highly accurate focus detection is performed. This will be described in detail below.

Figure 10:
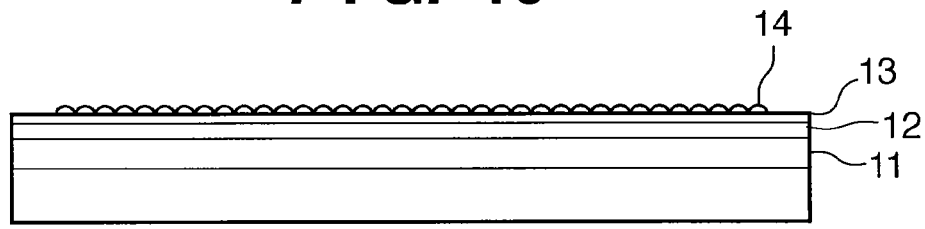
FIG. 10 is a schematic diagram of a layered CMOS sensor chip.

Generally, an image sensor such as a CMOS sensor is produced by laminating a plurality of layers on a silicon wafer. FIG. 10 is a diagram schematically illustrating a layered CMOS sensor chip that is included in the image sensor 107 of FIG. 1. In the CMOS sensor chip, a pad insulating layer is formed on a lower layer in which a photodiode and a transistor are formed so as to form unit pixels. Next, the pad insulating layer is selectively removed so as to expose the metal wiring of the lower layer. The metal wiring is used to connect the transistor to an external element. Depending on the scale of the circuit, a plurality of such wiring and insulating layers are formed. In FIG. 10, they are collectively shown as a wiring/insulating layer 11. That is, the wiring layer CL of FIGS. 4A to 6B is also included in the wiring/insulating layer 11.

Subsequently, a color photoresist is applied, and the resultant is exposed and developed to form a color filter layer 12. Next, a microlens planarization layer 13 is formed so that uniform microlenses can be formed. Then, a photoresist is applied onto the microlens planarization layer 13, and this is exposed and developed to form a patterned photoresist. Next, the patterned photoresist is heat-treated to reflow the photoresist so as to form a layer of dome-shaped microlenses 14. As described above, the CMOS sensor chip is produced layer by layer, so production errors occur between layers. The positional accuracy of the microlens 14 with respect to the wiring/insulating layer 11 depends on the alignment accuracy of the semiconductor manufacturing apparatus that forms the patterned photoresist. That is, a shift of the microlens ML with respect to the wiring layer CL shown in FIGS. 4A to 6B is caused by such alignment inaccuracies. Generally, the distance between the microlens ML and the photodiode PD is several micrometers. Meanwhile, the distance from the microlens ML to the exit pupil of the photographing lens 100 is expressed in units of several tens of millimeters. Accordingly, the optical imaging magnification will be several ten thousand-fold. If, for example, an alignment error of 0.1 micrometers occurs, it results in a very large shift of several millimeters in the exit pupil, causing the focus detection accuracy to decrease significantly.

Figure 11:
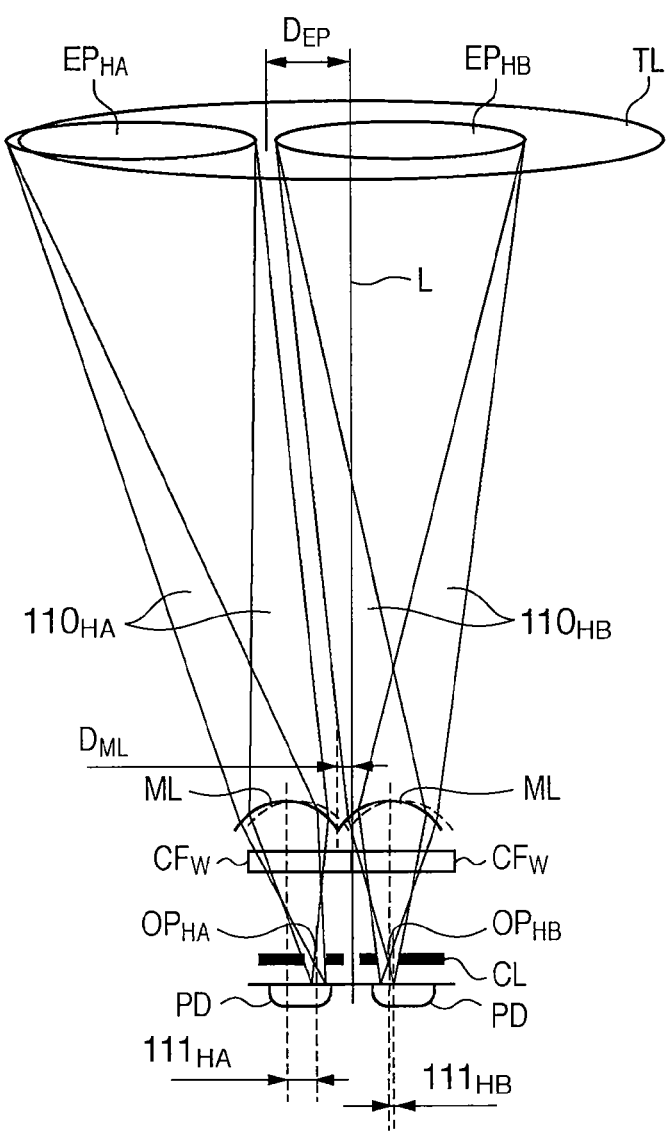
FIG. 11 is a diagram showing the structure shown in FIGS. 4A and 4B in which a microlens alignment error has occurred.

FIG. 11 shows the focus detection pixels for dividing the pupil in the horizontal direction (lateral direction) of the photographing lens shown in FIG. 4B, in which an alignment error in the horizontal direction has occurred in the microlens ML. In FIG. 11, the microlens ML is shifted to the left by an amount $D_{ML}$, and a microlens ML indicated by the dotted line shows the position when there is no alignment error (FIG. 4B). That is, the shift amount $D_{ML}$ of FIG. 11 is added to and subtracted from the offset amounts $41_{HA}$ and $41_{HB}$ of FIG. 4B, respectively and, as a result, the opening $OP_{HA}$ of the pixel $S_{HA}$ is offset to the right from the center line of the microlens ML by an amount $111_{HA}$. Likewise, the opening $OP_{HB}$ of the pixel $S_{HB}$ is offset to the left from the center line of the microlens ML by an amount $111_{HB}$. Thus, the pixels $S_{HA}$ and $S_{HB}$ receive light beams $110_{HA}$ and $110_{HB}$, respectively, that correspond to the exit pupil regions $EP_{HA}$ and $EP_{HB}$, which have shifted from the optical axis L of the photographing lens TL by an amount $D_{EP}$.

Figure 12:
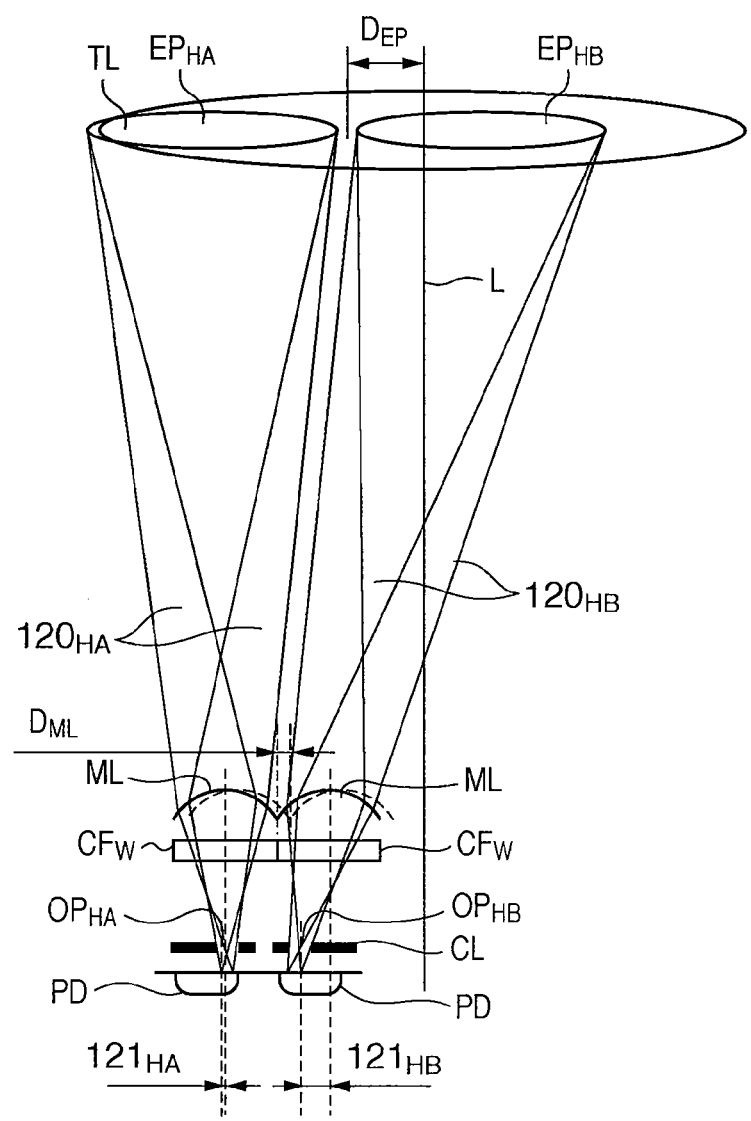
FIG. 12 is a diagram showing the structure shown in FIG. 5 in which a microlens alignment error has occurred.

FIG. 12 shows the focus detection pixels in the peripheral portion of the image sensor 107 shown in FIG. 5, in which, as in FIG. 9, an alignment error has occurred in the microlens ML. As described in FIG. 10, because the CMOS sensor chip is produced layer by layer, so a microlens alignment error does not vary depending on the position on the image sensor 107 and, thus, is constant. Accordingly, if an alignment error occurs by an amount $D_{ML}$ as shown in FIG. 11, in FIG. 12 as well, the microlens ML is shifted by the same amount $D_{ML}$ compared to the case in which there is no error as shown by a dotted-lined microlens ML (FIG. 5). That is, the shift amount $D_{ML}$ of FIG. 12 is added to and subtracted from the offset amounts $51_{HA}$ and $51_{HB}$ of FIG. 5, respectively and, as a result, the opening $OP_{HA}$ of the pixel $S_{HA}$ is offset to the right from the center line of the microlens ML by an amount $121_{HA}$. Likewise, the opening $OP_{HB}$ of the pixel $S_{HB}$ is offset to the left from the center line of the microlens ML by an amount $121_{HB}$. Thus, the pixels $S_{HA}$ and $S_{HB}$ receive light beams $120_{HA}$ and $120_{HB}$, respectively, that correspond to the exit pupil regions $EP_{HA}$ and $EP_{HB}$, which have shifted from the optical axis L of the photographing lens TL by an amount $D_{EP}$.

As for the focus detection pixels for dividing the pupil in the vertical direction described in FIG. 6B, the direction in which such an error occurs is vertical to the plane of the drawing, so no change occurs in the state of the divided pupil of the cross section. Accordingly, a detailed description thereof with reference to a drawing is omitted here. Although the foregoing was described in the context of the shift $D_{EP}$ as an alignment error of the microlens ML, in an actual camera, assembly alignment errors, such as parallel axis offsets, inclination offsets and the like of the image sensor 107, are also involved. However, for the shift $D_{EP}$, the alignment error of the microlens ML is most dominant.

Figure 13A:
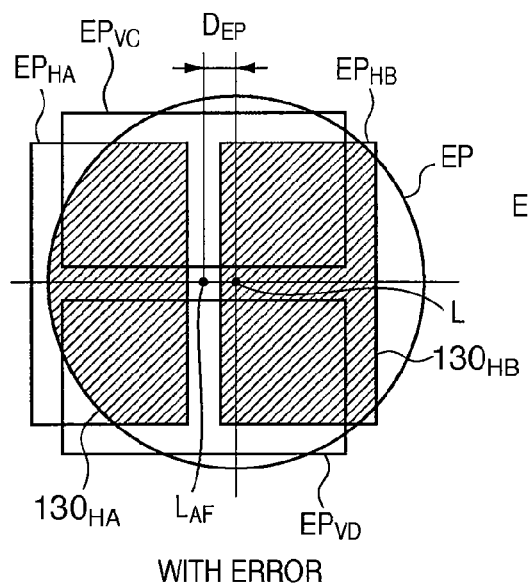
FIGS. 13A and 13B are diagrams of an exit pupil in which a microlens alignment error has occurred as viewed from an image sensor side.
Figure 13B:
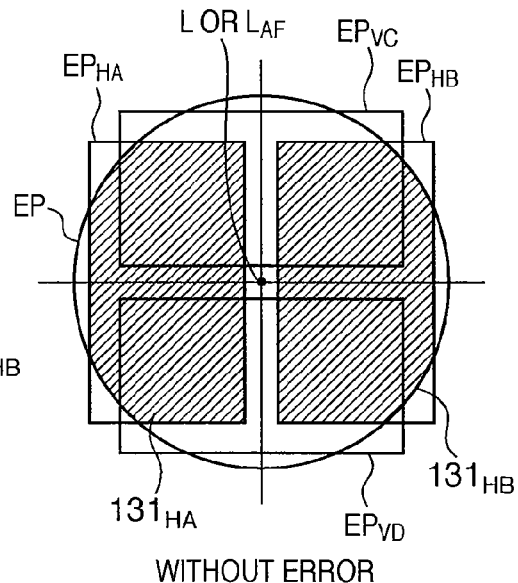
Figure 14A:
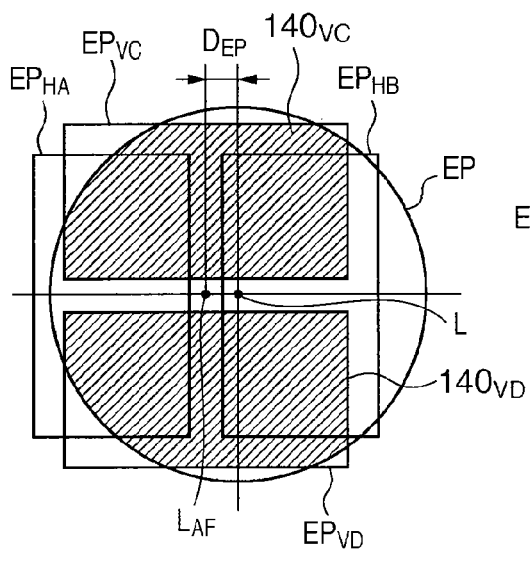
FIGS. 14A and 14B are diagrams of an exit pupil in which a microlens alignment error has occurred as viewed from an image sensor side.
Figure 14B:
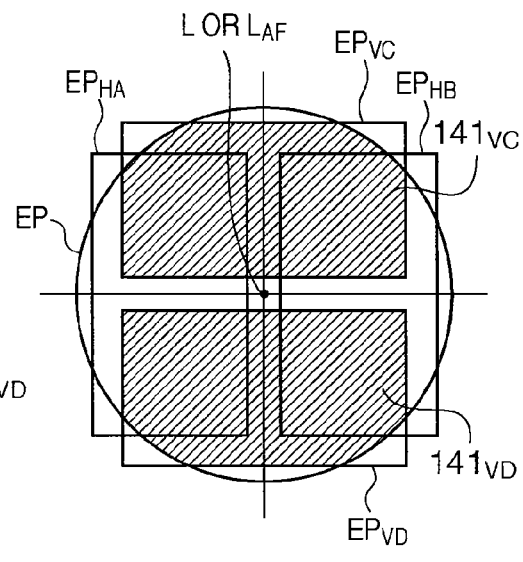

FIGS. 13A, 13B, 14A and 14B are diagrams of the exit pupil EP corresponding to the pixels in the vicinity of the axis of the image sensor 107 shown in FIG. 4B, 6B or 11, as viewed from the image sensor 107 side. FIGS. 13A and 14A show a state in which there is an error in the microlens ML, and the diagrams of FIGS. 13B and 14B show a state in which there is no error.

In FIG. 13A, the center $L_{AF}$ of the focus detection exit pupil regions $EP_{HA}$, $EP_{HB}$, $EP_{VC}$ and $EP_{VD}$ is located in a position shifted from the optical axis L of the photographing lens TL by an amount $D_{EP}$. $L_{AF}$ serves as the center axis of the focus detection unit of the present invention, and $D_{EP}$ corresponds to a central axis shift. Common regions in which the exit pupil EP overlaps with the focus detection exit pupil regions $EP_{HA}$ and $EP_{HB}$, that is, regions through which light beams used for focus detection actually pass are indicated by right-diagonally shaded regions $130_{HA}$ and $130_{HB}$ as shown in FIG. 13A. In this case, the diagonally shaded regions $130_{HA}$ and $130_{HB}$ are asymmetric to each other in the horizontal direction that is the pupil-dividing direction due to the central axis shift $D_{EP}$.

On the other hand, as shown in FIG. 13B, when there is no error in the microlens ML, the optical axis L and the center axis $L_{AF}$ of the focus detection unit match. Accordingly, the right-diagonally shaded regions $131_{HA}$ and $131_{HB}$ through which focus detection light beams pass are symmetric about the center axis $L_{AF}$ in the horizontal direction.

FIGS. 14A and 14B show the same diagrams as those of FIGS. 13A and 13B, but attention is paid to the focus detection exit pupil regions $EP_{VC}$ and $EP_{VD}$ that divide the exit pupil EP in the vertical direction. Common regions in which the exit pupil EP of the photographing lens TL overlaps with the focus detection exit pupil regions $EP_{VC}$ and $EP_{VD}$ are indicated by right-diagonally shaded regions $140_{VC}$ and $140_{VD}$. In this case, the diagonally shaded regions $140_{VC}$ and $140_{VD}$ are both laterally shifted due to the central axis shift $D_{EP}$, but they are laterally shifted while being vertically symmetric to each other in the vertical direction that is the pupil-dividing direction about the optical axis L or the center axis $L_{AF}$.

Although the foregoing was described in the context where a central axis shift $D_{EP}$ in the horizontal direction has occurred, when such a shift occurs in the vertical direction, or in both horizontal and vertical directions as well, the diagonally shaded regions through which focus detection light beams pass can be found in the same manner described above.

FIGS. 13A, 13B, 14A and 14B were described focusing on the pixels in the vicinity of the center of the image sensor 107, but in the peripheral portion, in addition to such shifting, the exit pupil EP of the photographing lens TL changes due to image height. FIG. 15 is a diagram illustrating such a change, in which the photographing lens 100 is shown as an entrance pupil $E_{NT}P$ and an exit pupil EP to simplify the drawing. The entrance pupil $E_{NT}P$ and the exit pupil EP are at different distances from the image sensor 107 and have different diameters, and light beams that enter the image sensor 107 have to pass through these two circles. Accordingly, the light beams that enter the pixel portion outside the vicinity of the optical axis L of the image sensor 107 are influenced not only by the exit pupil EP, but also by the entrance pupil $E_{NT}P$.

FIG. 16 is a diagram showing the image sensor 107 and exit pupil shapes depending on the corresponding image height of the image sensor 107. In FIG. 16, $EP_C$ indicates an exit pupil shape on the axis, and the subscripts T, B, L and R indicate image heights on the upper, lower, right and left sides, respectively. And for example, an exit pupil shape at the upper left corner is indicated by $EP_{TL}$ by combining T and L. As is clearly seen from FIG. 16, the exit pupil shape becomes smaller as the image height increases from the center of the image sensor 107. Accordingly, in Embodiment 1, a focus detection region is set to a region 160 indicated by the dotted line in FIG. 16, where the exit pupil shape changes relatively little in the full zoom/focus positions. In addition, by replacing the photographing lens 100 with a telecentric optical system in which the exit pupil shape changes little even at the edge of the image sensor 107, favorable focus detection capable of detecting the further edge of the photographing screen can be performed.

As described above, exit pupil regions of the exit pupil, through which focus detection light beams pass as indicated by the diagonally shaded portions of FIGS. 13A, 13B, 14A and 14B are determined by combining a central axis shift caused by a microlens alignment error and a change in the exit pupil shape of the photographing lens depending on the image height. In the phase-difference focus detection method, when such a change occurs in the exit pupil region, the following three main problems arise.

(1) Unbalanced amounts of light that enter each focus detection pixel pair.

(2) Deformation of focus detection signal by a change in the line spread in the pupil-dividing direction.

(3) An error in detecting the amount of defocus by a change in the base length.

Among them, (2) and (3) have less influence as it gets closer to the in-focus position, and theoretically diminish completely in the in-focus position, so by taking a little more time in the focusing time by devising a focus detection algorithm or the like, the influence on the final focusing accuracy can be reduced. However, the problem (1) has a greater influence on the accuracy of the correlation computation that calculates the amount of defocus. Accordingly, in Embodiment 1, regarding the problem (1), by correcting the signal level of a focus-adjusting signal pair so as to compensate for unbalanced amounts of light, highly accurate focus detection using the phase-difference method is achieved.

Figure 17:
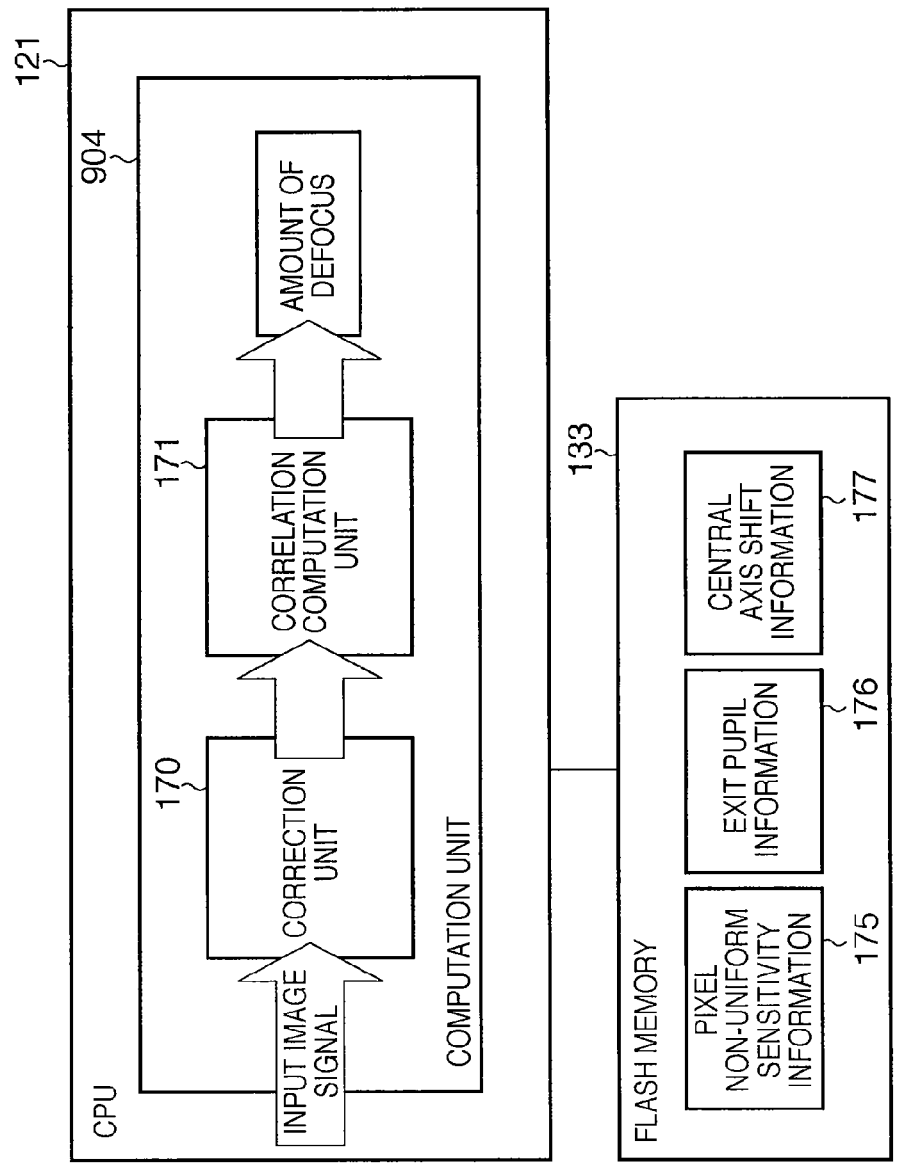
FIG. 17 is a block diagram showing a configuration for correcting a focus detection signal according to Embodiment 1 of the present invention.

FIG. 17 is a block diagram showing the detailed internal configuration of the computation unit 904 for correcting a focus detection signal pair in Embodiment 1 that is provided in the CPU 121 of FIG. 7. In FIG. 17, the focus detection signal formed by the connecting unit 903 of FIG. 7 is subjected to a correction including a correction of the problem (1) by a correction unit 170 of the computation unit 904 and, after that, inputted into a correlation computation unit 171.

The flash memory 133 connected to the CPU 121 stores pixel non-uniform sensitivity information 175 of the pixels that form a focus detection signal, exit pupil information 176 created from the image height of the photographing lens 100, and central axis shift information 177 created from a microlens alignment error. The pixel non-uniform sensitivity information 175 and the central axis shift information 177 are pieces of information written during the production process of the camera. The exit pupil information 176 contains in advance information under error-free design values.

Figure 18:
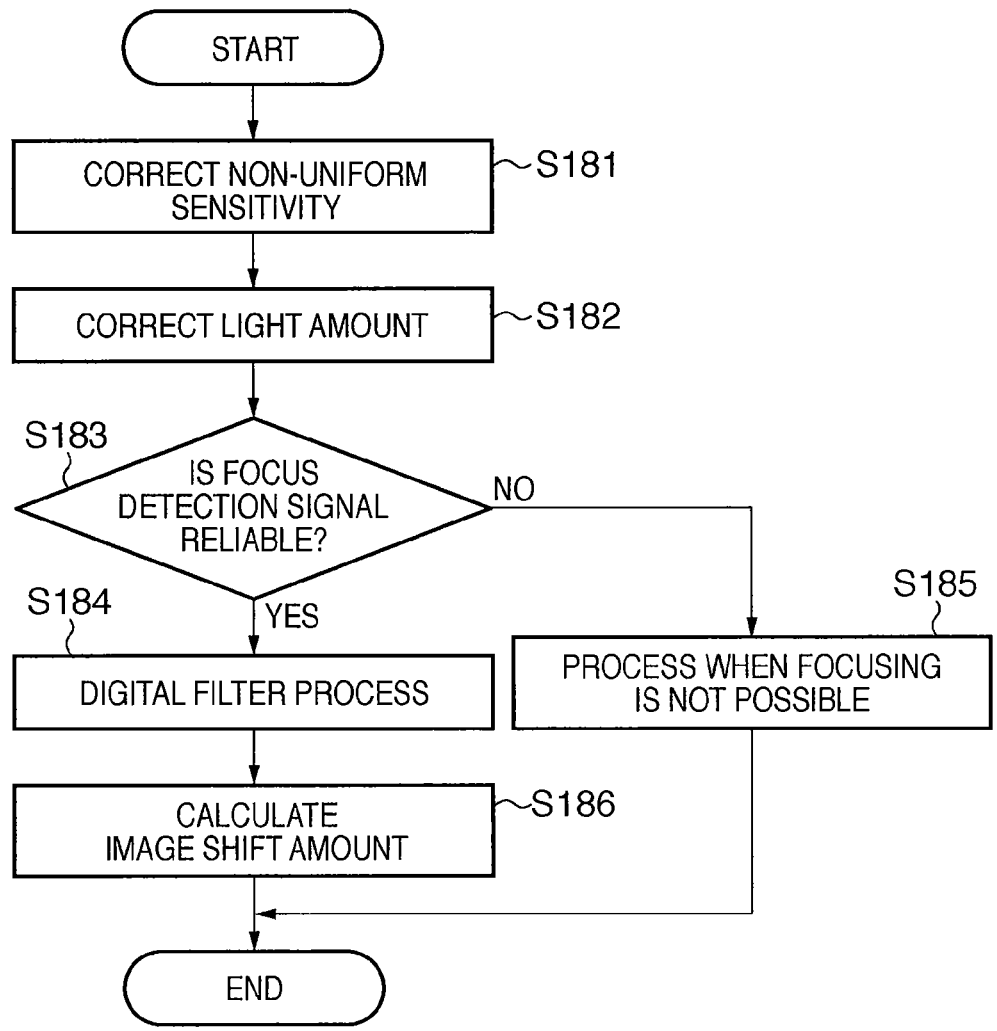
FIG. 18 is a flowchart illustrating a procedure for correcting a focus detection signal according to Embodiment 1 of the present invention.

FIG. 18 is a flowchart illustrating a procedure for correcting a focus detection signal according to Embodiment 1 of the present invention. First, the correction unit 170 performs a two-stage correction on a pair of focus detection signals inputted therein in steps S181 and S182. Then, the correlation computation unit 171 performs processes spanning from step S183 to S186.

In step S181, the non-uniform sensitivity of each pixel is corrected by multiplying the output value data of each pixel by a coefficient for correcting the non-uniform sensitivity based on the pixel non-uniform sensitivity information 175 stored in the flash memory 133.

In step S182, for each pair of pixels that form a pair of focus detection signals, the areas of the diagonally shaded regions as described in FIGS. 13A and 14A are calculated from the exit pupil information 176 and the central axis shift information 177. Then, the coefficients corresponding to the calculated areas are multiplied by the output value of each pixel so as to correct the amount of light. Here, if such area computation is performed for each pixel, because the amount of computation will be too large, focus detection will take a long time. To address this, the following method is employed to reduce the amount of computation.

Figure 19:
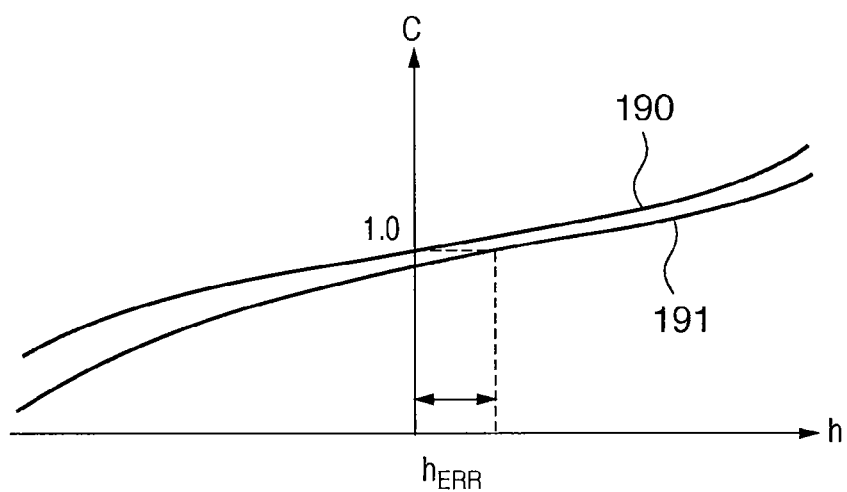
FIG. 19 is a graph showing the relationship between image height h and light amount ratio C of a focus detection pixel.

FIG. 19 shows a graph with the lateral axis representing the image height h of focus detection pixel pair and the longitudinal axis representing the light amount ratio C thereof. As used herein, "light amount ratio C" refers to the light amount ratio of the focus detection pixel $S_{HB}$ with respect to the focus detection pixel $S_{HA}$ of FIGS. 4A and 4B. 190 indicates a light amount ratio when a production error as described in FIGS. 13B and 14B does not exist and when h=0, the light amount ratio C=1.0. The light amount ratio indicated by 190 can be expressed by the following Equation (1) as a function of the image height h with the light amount ratio defined as C0.

$$C0 = f(h) \quad (1)$$

191 indicates the light amount ratio when a production error has occurred due to a microlens alignment error $D_{ML}$ or the like. The image height at which the focus detection pixel pair exhibits the same amount of light is shifted. If this shift amount is defined as $h_{ERR}$, when $h=h_{ERR}$, C=1.0. Because the entire curvature also varies according to $h_{ERR}$, the light amount ratio can be expressed by the following Equation (2), where the light amount ratio 191 is defined as $C_{ERR}$, and the image height h and the shift amount $h_{ERR}$ are variables.

$$C_{ERR} = f(h - h_{ERR}) \cdot g(h_{ERR}) \quad (2)$$

In the camera according to Embodiment 1, a change in the exit pupil of the photographing lens 100 is rotationally symmetric about the optical axis L, but the structure of the focus detection pixels of the image sensor 107 is not rotationally symmetric. Accordingly, instead of the image height h, by replacing the distance from the axis of the focus detection pixels of the image sensor 107 by (x,y) and the shift distance due to a production error by ($x_{ERR}$, $y_{ERR}$) the Equation (2) can be rewritten as the following Equation (3).

$$C(x_{ERR}, y_{ERR}) = f(x - x_{ERR}, y - y_{ERR}) \cdot g(x_{ERR}, y_{ERR}) \quad (3)$$

In the configuration described above, f(x,y) is pre-stored as exit pupil information 176, and ($x_{ERR}$, $y_{ERR}$) and g ($x_{ERR}$, $y_{ERR}$) are pre-stored as central axis shift information 177. Then, by multiplying the focus detection signal by a coefficient based on the light amount ratio $C(x_{ERR}, y_{ERR})$ calculated using the Equation (3), a correction with a reduced amount of computation becomes possible. Here, for the production error ($x_{ERR}$, $y_{ERR}$), such a microlens alignment error is dominant. According to the production method described in FIG. 10, an alignment error is a uniform shift in each wafer. Accordingly, by managing such an alignment error for each CMOS sensor chip in the production process of the camera, the need to check alignment errors for each device can be eliminated and, as a result, the process can be shortened. Other examples of the production error ($x_{ERR}$, $y_{ERR}$) include position alignment errors such as parallel axis offsets, inclination offsets and the like that can occur when the image sensor 107 is assembled in a camera.

When the stored information described above varies depending on the zoom or focus position of the photographing lens, the zoom or focus positions are divided as appropriate into groups, and information is stored for each divided position group. It should be noted that the photographing lens 100 of Embodiment 1 is assumed to be a photographing lens in which no change occurs in the exit pupil due to zooming or focusing.

In step S183, it is determined whether or not the focus detection signal corrected by the correction unit 170 is sufficiently reliable before subjecting the focus detection signal to the subsequent processes. Specifically, such a determination is performed by analyzing a contrast component of the image or the like.

Step S184 is a process performed when it is determined that the focus detection signal is reliable, in which a digital filter process is performed to remove frequency components unnecessary for computation. S185 is a process performed when it is determined that the focus detection signal is not reliable. In this case, a process when focusing is not possible is performed such as informing the user of the fact that focusing is not possible, and the process ends.

Finally, in step S186, an image shift amount is calculated by a known correlation computation. Then, as shown in FIG. 17, a focus shift amount of the photographing lens 100, or in other words, the amount of defocus is calculated based on the calculated image shift amount.

With the configuration as described above, even when the center axis of the focus detection exit pupil regions is shifted due to a microlens alignment error, by correcting the focus detection signal using the correction unit, highly accurate focus detection can be achieved. Although a configuration for correcting only the problem (1) from among the problems (1) to (3) listed above using the correction unit of Embodiment 1 was described, it is also possible to correct the problems (2) and (3) using the configuration of Embodiment 1. By doing so, more accurate focus detection can be performed even when defocused.

Embodiment 2

Embodiment 2 of the present invention will be described next.

Embodiment 2 differs from Embodiment 1 in that Embodiment 2 can cope with the case in which, in the photographing lens 100, the pupil distance changes significantly depending on the zoom or focus position.

FIG. 20 is a diagram for illustrating such a case, and shows focus detection pixels that correspond to the focus detection pixels of Embodiment 1 shown in FIG. 11. In FIG. 20, $EP_1$ indicates an exit pupil when the zoom position of the photographing lens 100 is at a telephoto end, and $EP_2$ indicates the exit pupil when the zoom position of the photographing lens 100 is at a wide-angle end. The exit pupil changes in a range indicated by dotted lines in FIG. 20 between the telephoto end and the wide-angle end.

As described above, in Embodiment 2, not only the diameter of the exit pupil changes according to the zoom position of the photographing lens 100, but also the distance from the microlens to the exit pupil, or in other words, the exit pupil distance changes. Accordingly, a shift $D_{EN}$ of the exit pupil regions $EP_{HA1}$ and $EP_{HB1}$ and a shift $D_{EP2}$ of the exit pupil regions $EP_{HA2}$ and $EP_{HB2}$ that are caused by a microlens ML alignment error $D_{ML}$ differ between the exit pupils $EP_1$ and $EP_2$.

Figure 21A:
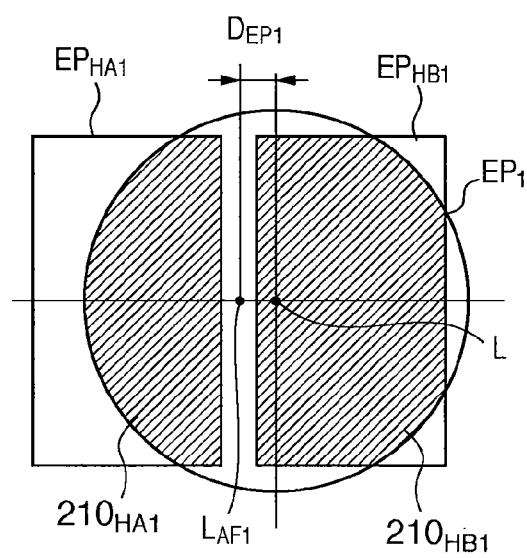
FIGS. 21A and 21B are diagrams of an exit pupil according to Embodiment 2 of the present invention as viewed from an image sensor side.
Figure 21B:
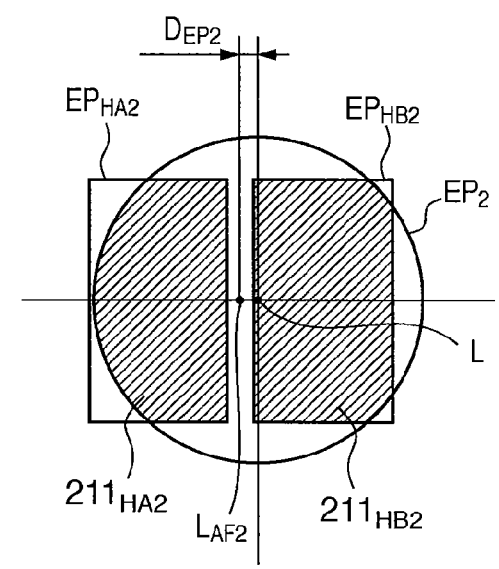

FIGS. 21A and 21B are diagrams of the exit pupil of the pixels in the vicinity of the axis of the image sensor 107 of FIG. 20 as viewed from the image sensor 107 side, with FIG. 21A showing the telephoto end side and FIG. 21B showing the wide-angle end side. The center $L_{AF1}$ of the focus detection exit pupil regions $EP_{HA1}$ and $EP_{HB1}$ and the center $L_{AF2}$ of the focus detection exit pupil regions $EP_{HA2}$ and $EP_{HB2}$ are located in a position shifted from the optical axis L of the photographing lens TL by the amounts $D_{EP1}$ and $D_{EP2}$, respectively. Here, $L_{AF1}$ and $L_{AF2}$ serve as the center axis of the focus detection unit in the exit pupils $EP_1$ and $EP_2$, respectively, and $D_{EP1}$ and $D_{EP2}$ correspond to central axis shifts. Common regions in which the exit pupil $EP_1$ overlaps with the focus detection exit pupil regions $EP_{HA1}$ and $EP_{HB1}$, and common regions in which the exit pupil $EP_2$ overlaps with the focus detection exit pupil regions $EP_{HA2}$ and $EP_{HB2}$, that is, the regions through which light beams that are actually used for focus detection pass are indicated by right-diagonally shaded regions $210_{HA1}$ and $210_{HB1}$, and $211_{HA2}$ and $211_{HB2}$, respectively.

As can be clearly seen from these diagonally shaded regions, the light amount ratios of the focus detection pixel pair are different on the telephoto end side and the wide-angle end side. This is because in addition to a change of the exit pupil from $EP_1$ to $EP_2$, the central axis shift changes from $D_{EP1}$ to $D_{EP2}$. Although FIGS. 20, 21A and 21B are described in the context of the pixels in the vicinity of the axis of the image sensor 107, in the peripheral portion, the degree of change in the central axis shift is different. Accordingly, it is necessary to store central axis shift information in a format associated with a change in the exit pupil distance rather than storing central axis shift information regarding one exit pupil as in Embodiment 1.

Specifically, if the distance from the image sensor 107 to the exit pupil is defined as 1, a central axis shift ($x_{ERR}$, $y_{ERR}$) in an arbitrary pixel position (x,y) of the image sensor 107 can be expressed by the following Equations (4) and (5) as a function of the distance l and the pixel position (x,y).

$$x_{ERR}=h(l,x) \quad (4)$$

$$y_{ERR}=i(l,y) \quad (5)$$

By pre-storing h(l,x) and i(l,y) in the camera as central axis shift information, and substituting the calculated ($x_{ERR}$, $y_{ERR}$) into the Equation (3) of Embodiment 1, the amount of light can be corrected. When writing h(l,x) and i(l,y) during the production process of the camera, the central axis shifts $D_{EP1}$ and $D_{EP2}$ at the distances to the two exit pupils $EP_1$ and $EP_2$ as shown in FIG. 20 are measured at a plurality of image heights. By doing so, h(l,x) and i(l,y) can be determined easily. In Embodiment 2, because the exit pupil changes according to the zoom position, f(x,y) and g($x_{ERR}$, $y_{ERR}$) of Equation 3 are also configured to be stored for each zoom position.

As described above, in Embodiment 2, the central axis shift information is stored in the camera as information in a format associated with a change in the exit pupil distance of the photographing lens 100 and, as a result, focus detection can be performed with good accuracy even in a camera to which a photographing lens that has a large pupil distance change is attached. The foregoing was described taking a change in the pupil distance by zooming of the photographing lens as an example, but Embodiment 2 of the present invention is also applicable to a camera system to which a plurality of photographing lenses having different exit pupils can be attached.

Embodiment 3

Embodiment 3 of the present invention will be described next.

Embodiment 3 shows an example in which the focus detection unit of Embodiment 1 is applied to a camera system.

Figure 22:
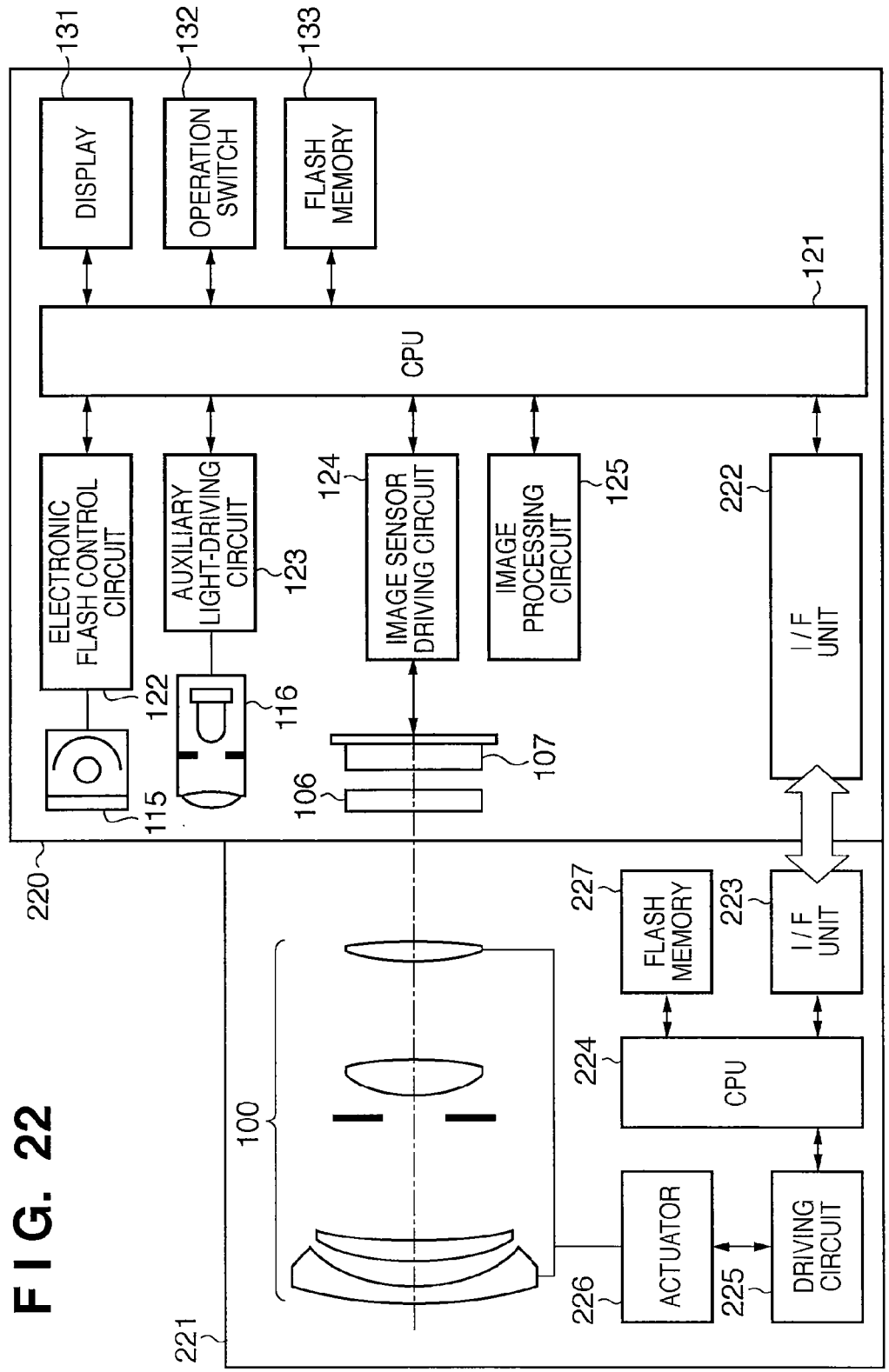
FIG. 22 is a block diagram showing a configuration of a camera system according to Embodiment 3 of the present invention.

FIG. 22 is a block diagram showing a configuration of a camera system according to Embodiment 3. The components indicated by the same reference numerals as those of Embodiment 1 have the same functions, so descriptions thereof are omitted here. In FIG. 22, 220 denotes a camera body, 221 denotes an interchangeable lens detachable from the camera body 220, and they are joined so as to be capable of information communication via I/F units 222 and 223. The interchangeable lens 221 includes a CPU 224 that performs various computation processes, and that is connected to a driving circuit 225 that drives the zoom, focus, diaphragm shutter and the like of the photographing lens 100. The driving circuit 225 is connected to an actuator 226. Furthermore, as in the camera body 220, a flash memory 227 into which various pieces of information can be rewritten is also included in the interchangeable lens 221.

Figure 23:
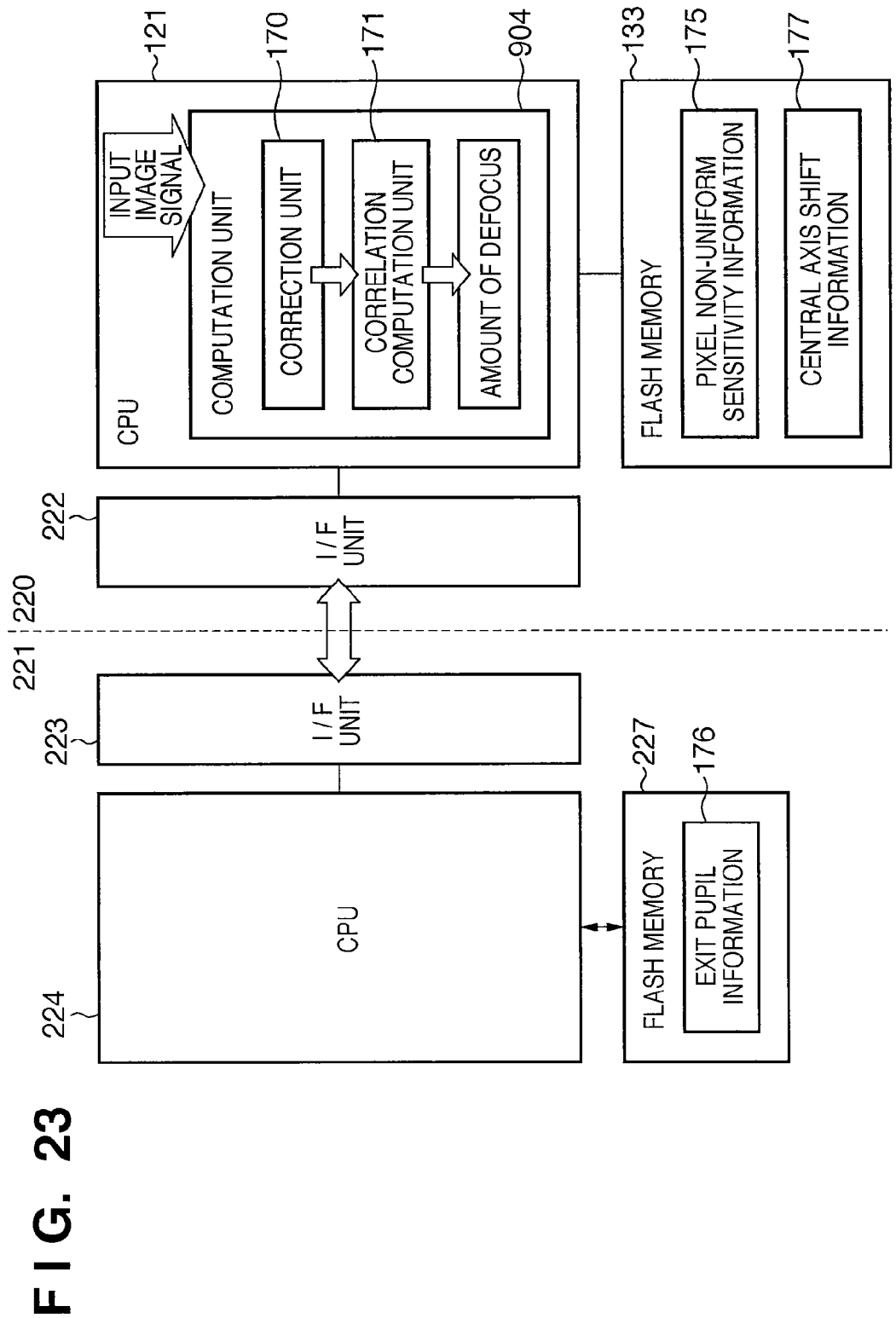
FIG. 23 is a block diagram showing a configuration for correcting a focus detection signal according to Embodiment 3 of the present invention.

FIG. 23 is a block diagram of a part of the block diagram of FIG. 22 that is relevant to the present embodiment so as to illustrate it in further detail. In FIG. 23, the camera body 220 is shown on the right side of the dotted center line, and the interchangeable lens 221 (lens unit) is shown on the left side of the same. A difference from Embodiment 1 is that the flash memory 133 of the camera body 220 includes only pixel non-uniform sensitivity information 175 and central axis shift information 177, and the flash memory 227 of the interchangeable lens 221 includes exit pupil information 176. Accordingly, even when a different type of lens is attached as the interchangeable lens 221, the exit pupil information 176 of that lens can be acquired via the I/F units 222 and 223.

Embodiment 3 is assumed to be applied to a camera system to which a plurality of photographing lenses having different exit pupil diameters and distances can be attached, so it is preferable that central axis shift information 177 is stored in a format as described in Embodiment 2. In order to reduce the capacity of the flash memory 133, it is effective to use central axis shift information 177 at the typical exit pupil distance of various interchangeable lenses, but it is obvious that the method according to Embodiment 2 is even more accurate. With the configuration as described above, by performing a correction as described in Embodiment 1 or 2 with the correction unit 170, highly accurate focus detection can be achieved even in a camera system.

Embodiment 4

Embodiment 4 of the present invention will be described next.

Embodiment 4 shows an example in which the present invention is applied to a camera system that includes a secondary imaging type focus detection unit of a phase-difference method, in comparison with Embodiment 1.

Figure 24:
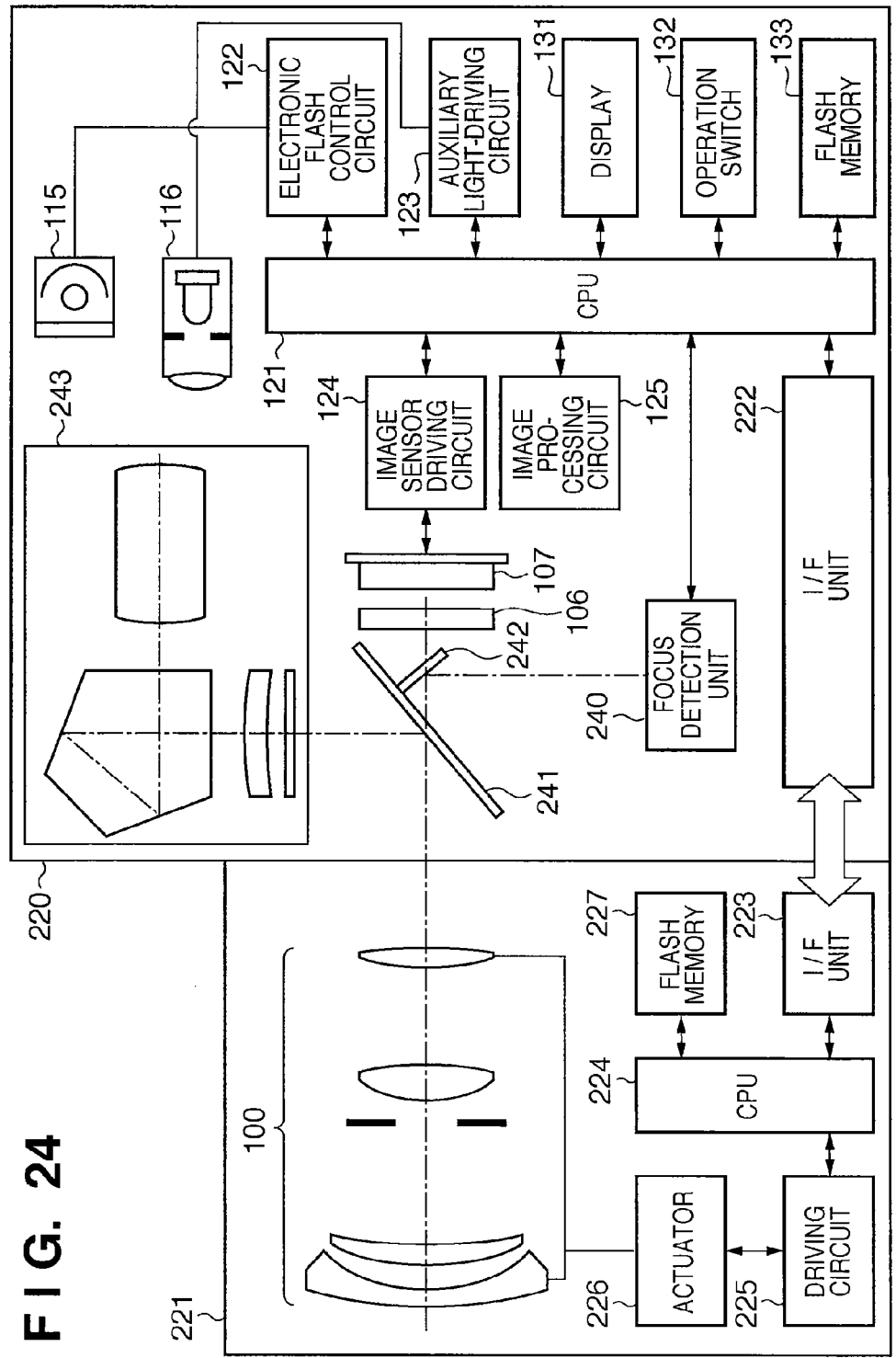
FIG. 24 is a block diagram showing a configuration of a camera system according to Embodiment 4 of the present invention.

FIG. 24 is a block diagram showing a configuration of a camera system according to Embodiment 4. The components indicated by the same reference numerals as those of Embodiments 1 to 3 have the same functions, so descriptions thereof are omitted here. In FIG. 24, the camera body 220 includes a secondary imaging type focus detection unit 240 of a phase-difference method. Accordingly, unlike Embodiment 1, the image sensor 107 is an image sensor designed specifically for image sensing that includes only the pixels shown in FIGS. 3A and 3B. A main mirror 241 and a sub-mirror 242 are disposed between the photographing lens 100 of the interchangeable lens 221 and the image sensor 107 so as to divide and polarize light beams that have passed through the photographing lens 100.

First, the main mirror 241 is configured with a half mirror that reflects some of the light beams that have passed through the photographing lens 100 toward the upper side and allow the rest of the light beams to pass therethrough. The light beams reflected by the main mirror 241 enter a viewfinder optical system 243 that includes a focusing screen, a condensing lens, a pentaprism and an eyepiece lens group, so that the user can view the object image. On the other hand, the light beams that have passed through the main mirror 241 are reflected toward the lower side by the sub-mirror 242, and enter the focus detection unit 240. The main mirror 241 and the sub-mirror 242 are configured by a known quick return mechanism, so they can be moved away from the optical path when photographing.

The focus detection unit 240 is a secondary imaging type focus detection unit of a phase-difference method, and has a known configuration that includes a field lens, a pair of secondary imaging lenses, a pair of light-receiving sensors and so on, so a description thereof is omitted here.

Figure 25:
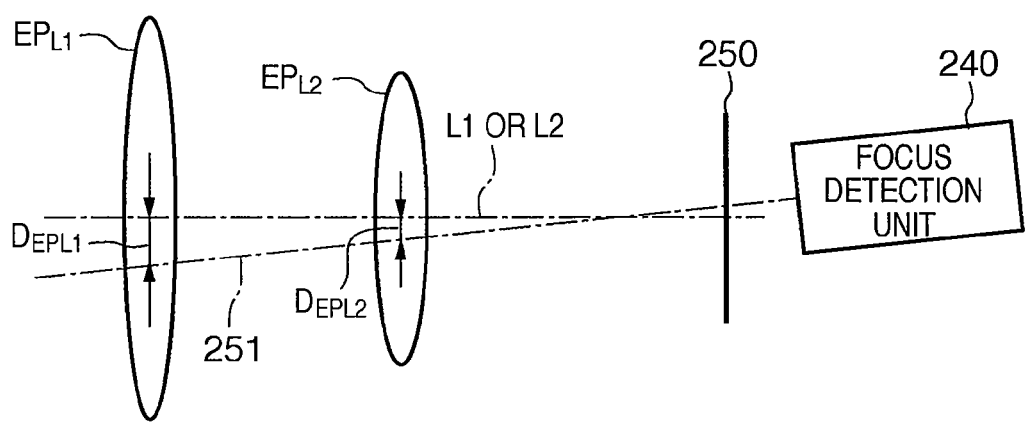
FIG. 25 is a conceptual diagram showing the relationship between a focus detection unit and the exit pupils of various interchangeable lenses according to Embodiment 4 of the present invention.

FIG. 25 is a conceptual diagram showing the relationship between the focus detection unit 240 and the exit pupils of various interchangeable lenses, and is an exploded view in which the main mirror 241 and the sub-mirror 242 of FIG. 24 are omitted. In FIG. 25, $EP_{L1}$ indicates the exit pupil of an interchangeable lens, and $EP_{L2}$ indicates the exit pupil of another interchangeable lens. L1 and L2 indicate the optical axes of these interchangeable lenses, and are shown as a single line in FIG. 25 because the two optical axes are overlapping. 250 indicates a primary imaging surface that is the focal surface of the interchangeable lenses, disposed in a position optically equivalent to the image sensing surface of the image sensor 107 of FIG. 24. The focus detection unit 240 is disposed in the rear of the primary imaging surface 250, with a center axis 251 of the focus detection unit 240 indicated by a long dashed short dashed line.

The center axis 251 is shifted from the optical axes L1 and L2 by a production error, creating a central axis shift $D_{EPL1}$ on the exit pupil $EP_{L1}$, and a central axis shift $D_{EPL2}$ on the exit pupil $EP_{L2}$. That is, this indicates that when the center axis 251 of the focus detection unit 240 shifts, in the camera system to which various photographing lenses with different exit pupils can be attached, the central axis shift varies depending on the exit pupil distance. Accordingly, by pre-storing central axis shift information in a format associated with such exit pupil distances in the camera, highly accurate focus detection can be performed by the method described in Embodiment 2.

The central axis shift described in Embodiment 4 can occur through a positional error of the main mirror 241 or the sub-mirror 242, a production error in the field lens of the focus detection unit 240, or the like. To address this, several methods have been disclosed in which a mechanism that adjusts the central axis shift of the focus detection unit 240 is provided so as to perform adjustment during assembly/production thereof, but by applying Embodiment 4, the need for such a mechanism can be eliminated, achieving the effect of reduced costs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-215918, filed Aug. 25, 2008, which is hereby incorporated by reference herein in its entirety.

What is claimed is:

1. An image sensing apparatus comprising:
   an image sensor, including a plurality of focus detection pixel pairs that perform photoelectric conversion on each pair of light beams, configured to output an image signal pair for detecting focus position from the focus detection pixels pairs;
   a correction unit configured to correct a signal level of the image signal pair based on correction information, wherein the correction information is related to first information and second information, wherein the first information is related to a production error which includes an alignment error at a time of forming the image sensor, and the second information is related to a light amount which changes in response to an image height when the production error does not exist; and
   a focus detection unit configured to detect a focus position of a lens using the image signal pair corrected by the correction unit.

2. The image sensing apparatus according to claim 1, wherein an exit pupil information includes information regarding an exit pupil shape depending on an image height of each of the focus detection pixel pairs, and the correction unit determines a ratio between exit pupil areas corresponding to respective pixels of each of the focus detection pixel pairs based on the exit pupil shape of each of the focus detection pixel pairs based on a shift information, and corrects the image signal pair based on the determined ratio.

3. The image sensing apparatus according to claim 2, wherein the correction unit further corrects the shift information of the focus detection pixel pair in each position of the image sensor based on an exit pupil distance to an exit pupil of the lens, and determines the ratio of an exit pupil areas based on the corrected shift information.

4. The image sensing apparatus according to claim 1, wherein the image sensor is an image sensor for use in photographing an image, and some of the pixels of the image sensor are configured as focus detection pixel pairs.

5. The image sensing apparatus according to claim 1, wherein the image sensor is a focus detection image sensor configured separately from the image sensor for use in photographing an image.

6. The image sensing apparatus according to claim 1, wherein a shift information is information that is set at least for each image sensing apparatus.

7. The image sensing apparatus according to claim 1, wherein a shift information is information indicative of a shift on a plane of an exit pupil of the lens.

8. The image sensing apparatus according to claim 1, wherein a shift information is information corresponding to a pupil distance change of the lens.

9. The image sensing apparatus according to claim 1, wherein the second information shows a light amount ratio between focus detection pixel pairs.

10. The image sensing apparatus according to claim 1, wherein the focus detection pixel pairs are configured to perform photoelectric conversion on each pair of light beams that have passed through different regions of the lens.

11. The image sensing apparatus according to claim 1, further comprising, a storage unit configured to store the first information and the second information.

12. An image sensing system comprising:
    the image sensing apparatus according to claim 1,
    a lens unit that is detachable from the image sensing apparatus,
    wherein a shift information is stored in the image sensing apparatus, an exit pupil information is stored in the lens unit, and the exit pupil information is transmitted from the lens unit to the image sensing apparatus.

13. A focus detection method in an image sensing apparatus, the method comprising the steps of:
    performing photoelectric conversion on each pair of light beams and outputting an image signal pair for detecting focus position from a plurality of focus detection pixel pairs, included in an image sensor;
    correcting a signal level of the image signal pair based on correction information, wherein the correction information is related to first the shift information and second information, wherein the first information is related to a production error which includes an alignment error at a time of forming the image sensor, and the second information is related to a light amount which changes in response to an image height when the production error does not exist; and
    detecting a focus position of a lens using the image signal pair corrected in the correction step.

* * * * *